(12) United States Patent
Shimura

(10) Patent No.: US 12,461,074 B2
(45) Date of Patent: Nov. 4, 2025

(54) SCANNING UNIT, SYSTEM, AND METHOD

(71) Applicant: ACE BioAnalysis Inc., Fukushima (JP)

(72) Inventor: Kiyohito Shimura, Fukushima (JP)

(73) Assignee: ACE BioAnalysis Inc., Fukushima (JP)

( * ) Notice: Subject to any disclaimer, the term of this patent is extended or adjusted under 35 U.S.C. 154(b) by 311 days.

(21) Appl. No.: 18/222,204

(22) Filed: Jul. 14, 2023

(65) Prior Publication Data
US 2023/0358713 A1 Nov. 9, 2023

Related U.S. Application Data

(63) Continuation of application No. PCT/JP2021/011222, filed on Mar. 18, 2021.

(30) Foreign Application Priority Data

Jan. 15, 2021 (JP) .................................. 2021-005159
Feb. 2, 2021 (JP) .................................. 2021-015080

(51) Int. Cl.
*G01N 30/60* (2006.01)

(52) U.S. Cl.
CPC ..... *G01N 30/60* (2013.01); *G01N 2030/6008* (2013.01)

(58) Field of Classification Search
CPC ........... G01N 30/60; G01N 2030/6008; G01N 30/6039; G01N 30/74; G01N 27/44721; G01N 21/64
See application file for complete search history.

(56) References Cited

U.S. PATENT DOCUMENTS 4,231,661 A * 11/1980 Walsh .................... G01N 21/47
356/340
6,361,672 B1 * 3/2002 Zhu ....................... G01N 21/645
204/603
10,794,860 B2 * 10/2020 Roach .............. G01N 27/44704
(Continued)

FOREIGN PATENT DOCUMENTS

JP 2006-284530 A 10/2006
JP 6422131 B2 11/2018
(Continued)

OTHER PUBLICATIONS

International Search Report issued in PCT/JP2021/011222 mailed on Jun. 8, 2021 with English Translation (6 pages).
(Continued)

*Primary Examiner* — Francis C Gray
(74) *Attorney, Agent, or Firm* — Nakanishi IP Associates, LLC

(57) ABSTRACT

The present disclosure is to provide a scanning unit that enables simple and highly accurate detection of a sample in a capillary. A scanning unit according to the present disclosure is a scanning unit that moves in the axial direction of a capillary and includes an optical system unit having an optical system and a restriction unit that restricts the capillary to a predetermined position. The optical system unit includes a first optical system having one or more optical elements that transmits incident-side light to a predetermined position along a first optical axis; and a second optical system having one or more optical elements transmitting output light along a second optical axes.

20 Claims, 12 Drawing Sheets

(56) References Cited

U.S. PATENT DOCUMENTS

| | | | |
|---|---|---|---|
| 2005/0000812 A1* | 1/2005 | Couderc | G01N 27/44791 204/600 |
| 2006/0219559 A1 | 10/2006 | Ugai et al. | |
| 2010/0140505 A1* | 6/2010 | Pang | G01N 21/6428 250/459.1 |
| 2015/0090013 A1* | 4/2015 | Dasgupta | G01N 30/64 73/61.58 |
| 2015/0346151 A1* | 12/2015 | Boeke | G01N 27/44782 204/601 |
| 2016/0245778 A1 | 8/2016 | Shimura et al. | |
| 2017/0016853 A1* | 1/2017 | Maher | G01N 27/44791 |
| 2018/0372681 A1* | 12/2018 | Arai | G01N 27/44721 |
| 2023/0358705 A1* | 11/2023 | Shimura | G01N 27/44721 |

FOREIGN PATENT DOCUMENTS

| | | |
|---|---|---|
| WO | 2009/088663 A1 | 7/2009 |
| WO | 2015/048769 A1 | 4/2015 |
| WO | 2015/072265 A1 | 5/2015 |

OTHER PUBLICATIONS

Written Opinion of International Searching Authority issued in PCT/JP2021/011222 mailed on Jun. 8, 2021 with English Translation (7 pages).

Office Action issued in Japanese Patent Application No. 2021-005159 mailed on Jun. 4, 2021, with English Translation (8 pages).

Office Action issued in Japanese Patent Application No. 2021-005159 mailed on Jan. 11, 2022, with English Translation (4 pages).

Office Action issued in Japanese Patent Application No. 2021-015080 mailed on Mar. 22, 2022, with English Translation (6 pages).

Shimura, Kiyohito. Evolution of capillary isoelectric focusing brought by the use of in situdetection of a ph gradient. Electrophoresis letters. 2020, vol. 64, p. 31, Internet: <URL:https://www.jstage.jst.go.jp/article/electroph/64/1/64_31/_pdf/-char/ja> (cited in ISR and WOSA).

"A critical retrospective and prospective review of designs and materials in in-line solid-phase extraction capillary electrophoresis," Analytica Chimica Acta 1079 (2019)1-19 Laura Pont et al. May 22, 2019.

* cited by examiner

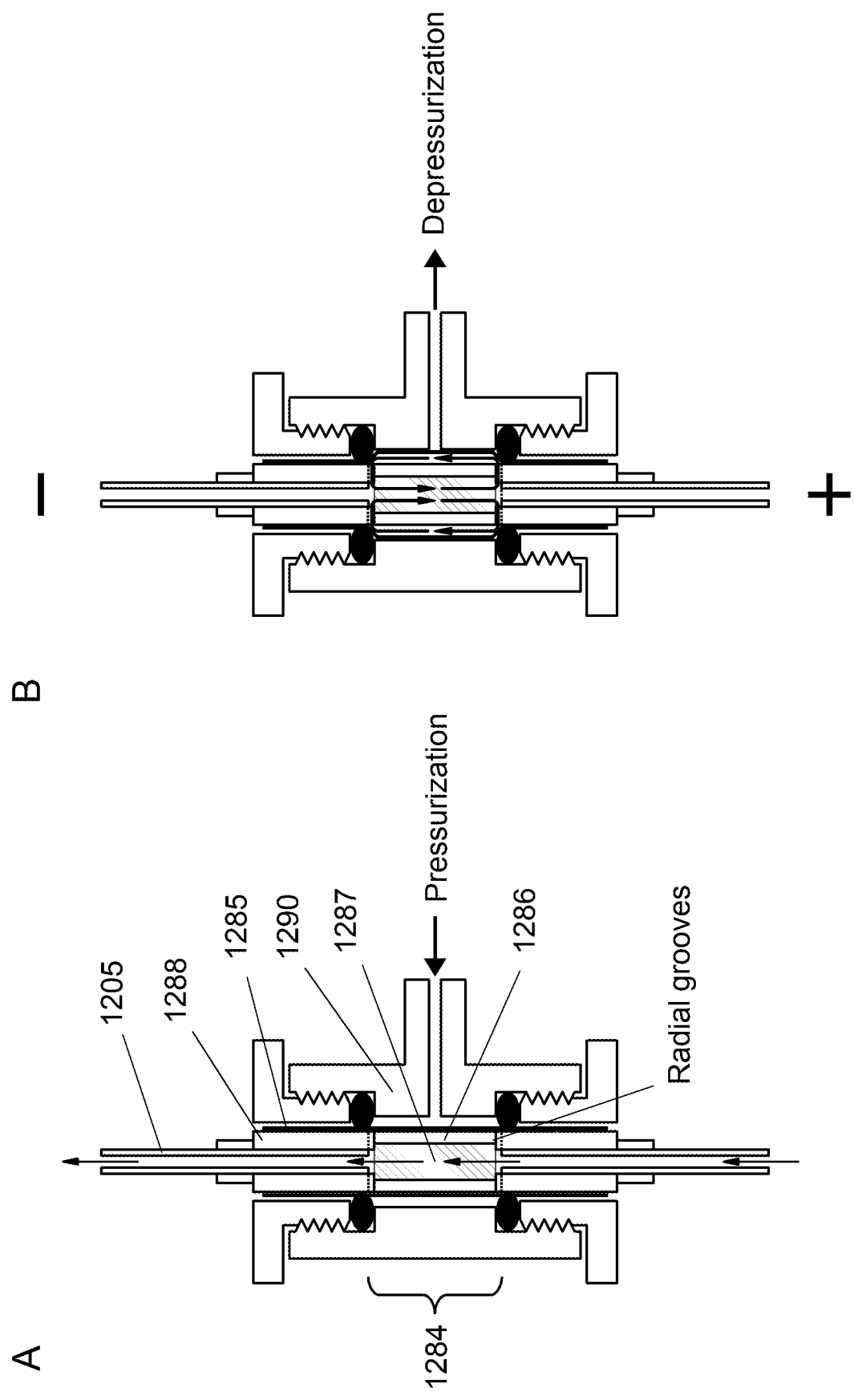

SCANNING UNIT, SYSTEM, AND METHOD

BACKGROUND OF THE INVENTION

Technical Field

The present disclosure relates to a scanning unit, a system, and methods, particularly suitable for sample detection in capillary isoelectric focusing. The present disclosure also relates to a microcolumn that can be used in capillary electrophoresis and high-performance liquid chromatography (HPLC).

Background Technology

Samples such as proteins often exists as multiple molecular types, although derived from a single gene, due to post-translational modifications such as phosphorylation and glycosylation. The distribution pattern of such molecular types relates to regulation of the function of the protein in cells and organisms. In other words, it is thought that the distribution pattern reflects the physiological state of cells and individuals, and useful information about the state of a living organism can be obtained from the pattern. The method that has great potential for analysis of molecular-type patterns produced by post-translational modifications of proteins is capillary isoelectric focusing, which has high resolution and completes separation in a short time.

Photodetection is a method for detecting a sample separated by capillary isoelectric focusing. This is a method in which light is applied to a sample in a capillary and the sample is detected from the response to that light. As such sample detection methods, there are a method of detecting the entire capillary and a method of detecting only at a fixed point on the capillary. Methods for detecting the entire capillary include scanning detection in which the entire capillary is scanned and imaging detection in which the entire capillary is photographed. For scanning detection, there are a method in which the capillary is moved with respect to a fixed detector and a method in which the detector is moved with respect to a fixed capillary. For example, if there are space restrictions for the device, it is more advantageous to scan the detector while the capillary is fixed than to move the capillary. (See Patent Document 1).

Also, in analytical techniques using capillaries such as capillary electrophoresis and HPLC, various capillaries are used for piping to form a series of fluid communication channels by connecting functional capillaries such as chromatography columns, valves and samplers. For example, these capillaries are attached with a sleeve member to the tip of the unconnected capillary to expand the outer diameter of the capillary and the assembly is fitted with a ferrule member (often integrated with a set screw). Then, by pushing them into the union, one capillary is fixed to the union with a set screw, and the other capillary is similarly fixed to the same union, so that the connection is made while keeping the pipes liquid-tight. Thus, a plurality of members is used to connect capillaries, and the connecting portion often occupies a large volume (Patent Document 2, etc.). Also, when a plurality of members is attached to the connecting part, a certain length is required for the capillary to attach these members, for example, a very short functional capillaries such as chromatography columns can be difficult to connect to begin with.

PRIOR ART DOCUMENTS

Patent Documents

Patent Document 1: U.S. Pat. No. 6,422,131
Patent Document 2: International Publication No. 2009/088663

SUMMARY OF THE INVENTION

Problems to be Solved by the Invention

However, Patent Document 1 does not disclose any specific configuration of a scanning detector that detects a focused sample by capillary isoelectric focusing.

An object of the present disclosure is to provide a scanning unit that enables simple and highly accurate detection of a sample in a capillary.

Methods to Solve Problems

As a result of extensive research, the present inventors have developed a scanning unit, a scanning system, and scanning method, and a microcolumn that can be connected to existing capillaries used in capillary electrophoresis and LC-MS. In one aspect, the scanning unit of the present disclosure includes an optical system unit and a restrictor that restricts the capillary to a predetermined position. In one aspect, the present disclosure provides a sample detection system using a scanning unit. In one aspect, the present disclosure provides a method of detecting a sample using a system of the disclosure. In one aspect, the microcolumns of the present disclosure are capillary connectors. In one aspect, the microcolumns of the present disclosure are small-sized functional members with functionality such as separation. In one aspect, the present disclosure provides a microcolumn that can be usefully used in analytical techniques using capillaries such as capillary electrophoresis and LC-MS, and a method for producing the microcolumn.

Accordingly, the present disclosure provides the following.

(Item A1)

A scanning unit that moves in the axial direction of a capillary, the scanning unit comprising: an optical system unit having an optical system; a restriction unit restricting the capillary in an appropriate position, and the optical system unit comprising: the first optical system having one or more optical elements that transmits light along the first optical axis to the appropriate position; and the second optical system having one or more optical elements that transmits emitted light from the appropriate position along the second optical axis.

(Item A2)

The scanning unit according to item 1, wherein the first optical system and the second optical system are arranged such that an angle formed by the first optical axis and the second optical axis is not 180 degrees.

(Item A3)

The scanning unit according to any of the preceding items, wherein the restriction unit comprises a restriction plate with grooves or holes restricting radial movement of the capillary relative to the optical system unit.

(Item A4)

The scanning unit according to any one of the preceding items, wherein the restriction unit further includes a pressure plate, and the pressure plate is configured to sandwich the capillary placed in the groove in a pressed state.

(Item A5)

The scanning unit according to any one of the preceding items, further comprising a position-adjusting mechanism for changing the relative position between the restriction unit and the optical system unit.

(Item A6)

The scanning unit of any one of the preceding items, wherein a contact surface is provided between the restriction unit and the optical system unit, and the position-adjusting mechanism is configured such that either the restriction unit or the optical system unit slides along the contact surface.
(Item A7)

The scanning unit according to any one of the preceding items, wherein the optical elements of the first optical system include an incident-side condenser lens, and the optical elements of the second optical system include an exit-side condenser lens.
(Item A8)

The scanning unit according to any one of the preceding items, wherein the second optical system further includes a light transmission-member connecting port that connects an light transmission member to the scanning unit, and the light on the exit side is transmitted to the photodetector via the light transmission member.
(Item A9)

The scanning unit according to any one of the preceding items, further comprising a photodetector and/or filter unit, said photodetector and/or filter unit configured to be directly connected with said second optical system.
(Item A10)

The scanning unit according to any one of the preceding items, comprising the first housing containing the optical system and the second housing containing the photodetector and/or filter unit, wherein the thickness of the first housing in the scanning direction of the scanning unit is less than the thickness of the second housing.
(Item A11)

A light detection system, said system comprising a capillary having a scanning region, a light source, a scanning unit according to any one of the preceding items, and a photodetector receiving the light emitted from said scanning unit.
(Item A12)

A light-detection system, comprising a capillary having a scanning region, a light source, and the scanning unit according to any one of the preceding items.
(Item A13)

The system according to any one of the preceding items, further comprising: an anolyte solution connected to the first end of the capillary; a catholyte solution connected to the second end of the capillary; and a boundary detector for detecting a boundary between different solutions in the capillary.
(Item A14)

The system according to any one of the preceding items, further comprising a frame surrounding the scan area.
(Item A15)

A method of detecting a sample separated by capillary isoelectric focusing using the system according to any one of the preceding items.
(Item B1)

A microcolumn for use in a connection structure,
said connection structure comprising said microcolumn and two capillaries,
said two capillaries being positioned with a predetermined space,
said microcolumn comprising a connector and an inner column tube containing a packing material,
said connector comprising a tubular member and two intermediate tubes disposed within the tubular member with the predetermined space therebetween,
said inner column tube being positioned in said predetermined space,
and said two intermediate tubes each comprising an opening for receiving said capillary.
(Item B2)

The microcolumn of any of the preceding items, wherein said predetermined space has a length of about 1-20 mm.
(Item B3)

The microcolumn of any of the preceding items, wherein said tubular member has an inner diameter of about 0.2-2 mm.
(Item B4)

The microcolumn of any of the preceding items, wherein said packing material is a monolithic structure.
(Item B5)

The microcolumn of any of the preceding items, wherein the inner diameter of the inner column tube is greater than the inner diameter of the intermediate tube.
(Item B6)

The microcolumn of any of the preceding items, wherein the intermediate tube is made of fluororesin.
(Item B7)

A microcolumn of any of the preceding items further comprising force applying mechanism for applying an external force to the tubular member, wherein the tubular member being deformed by the application of the external force using the force applying mechanism, thereby expanding or contracting the predetermined space.
(Item B8)

A microcolumn of any of the preceding items, wherein the force-applying mechanism includes a pressure-control member, and the pressure control-member is arranged around a portion of the tubular member covering at least the predetermined space so as to form a pressure-controlled space between the pressure-control member and the tubular member.
(Item B9)

The microcolumn of any of the preceding items, wherein the pressure-control member expands the predetermined space by reducing the pressure in the pressure-controlled space and contracts the predetermined space by pressurizing the pressure-controlled space.
(Item B10)

The microcolumn of any one of the preceding items, wherein at least a portion of the tubular member covering the predetermined space is made of a flexible material.
(Item B11)

The microcolumn of any one of the preceding items, wherein said flexible material is a silicone material.
(Item B12)

The microcolumn of any one of the preceding items, wherein said tubular member is made of a heat-shrinkable material.
(Item B13)

A microcolumn of any one of the preceding items, characterized by the absence of an external pressing member in use.
(Item B14)

The microcolumn of any one of the preceding items, wherein said tubular member partially covers the end of said intermediate tube.
(Item B15)

A micro-column kit comprising the microcolumn of any one of the preceding items, said capillaries, and positioning apparatus defining a position where said capillary is received in said intermediate tube.

(Item B16)

The microcolumn kit of any one of the preceding items, wherein the positioning apparatus is a stopper attached to the capillary or an indicator provided on the capillary.
(Item B17)

A method of manufacturing a microcolumn of any one of the preceding items, comprising inserting the inner column tube into the tubular member and inserting the intermediate tube into the tubular member.
(Item B18)

A method for manufacturing a microcolumn according to any one of the preceding items, comprising the steps of: forming a monolithic packing material inside a column tube; cutting the column tube to fabricate the inner column tube; inserting the inner column tube into the tubular member; and inserting the intermediate tubes into the tubular member.

In the present disclosure, it is intended that one or more of the above features may be provided in further combinations in addition to the explicit combinations. Still further embodiments and advantages of the present disclosure will be appreciated by those skilled in the art upon reading and understanding the following detailed description, if necessary.

Effect of the Invention

According to the present disclosure, a scanning unit that enables simple and highly accurate detection of a sample in a capillary can be obtained.

Providing the microcolumn, the present disclosure further provides effects such as, enabling compact connections of capillaries, providing microscopic separation systems applicable to microsamples, and/or enabling fine control of flow in capillary system.

BRIEF DESCRIPTION OF DRAWINGS

FIG. 15 is a schematic diagram of the operation of the microcolumn of FIG. 14.

MODE FOR CARRYING OUT THE INVENTION

Figure 1:
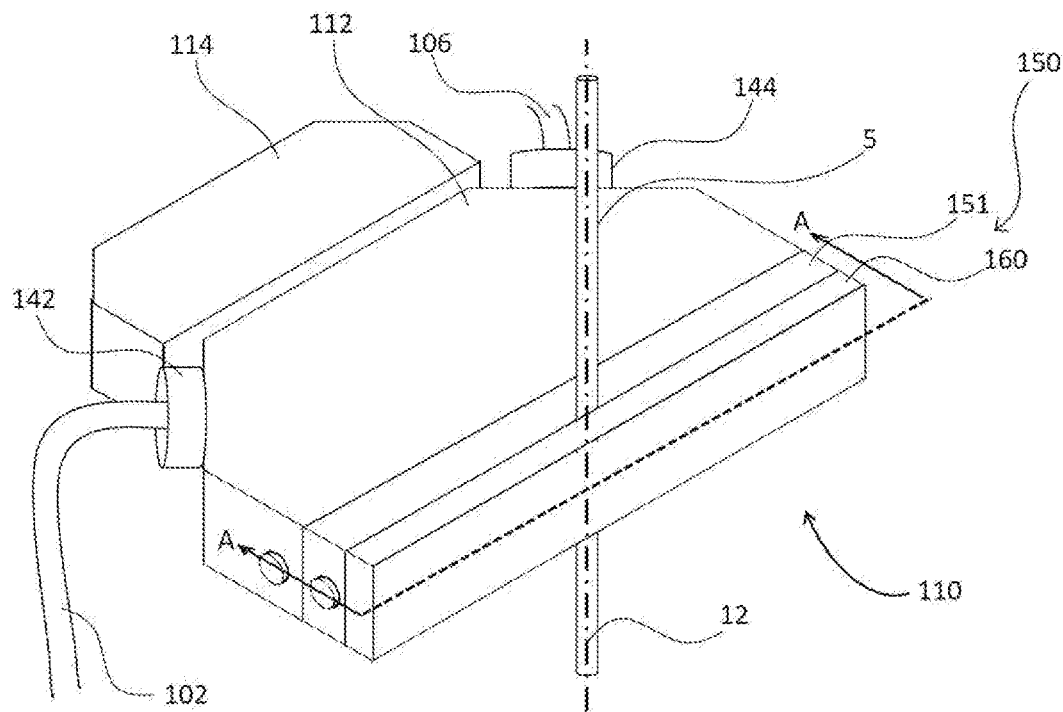
FIG. 1 is a perspective view of the first embodiment of a scanning unit according to the present disclosure.

Hereinafter, the present disclosure will be described while showing the best mode. Throughout this specification, it should be understood that expressions in the singular also include their plural concepts unless specifically stated otherwise. Thus, articles in the singular (e.g., "a", "an", "the", etc. in the English language) should be understood to include their plural concepts as well, unless specifically stated otherwise. Also, it should be understood that the terms used in this specification have the meanings commonly used in the relevant field unless otherwise specified. Thus, unless defined otherwise, all technical and scientific terms used herein have the same meaning as commonly understood by one of ordinary skill in the art to which this disclosure belongs. In case of conflict, the present specification (including definitions) will control.

Definitions of terms and/or basic technical content particularly used in the present specification will be described below as appropriate.

Definitions, Etc

As used herein, the term "capillary" refers to a hollow tube having a small inner diameter (typically about 0.01 to about 1 mm). Capillaries used in capillary electrophoresis and HPLC are often made of fused silica or glass, but the capillary material is not particularly limited. Capillaries are normally liquid-tight except for their end portions. The capillary may be coated on the outside with polyimide or the like.

As used herein, the term "optical axis" refers to an axis formed by a straight line connecting the center of one or more optical elements and the focal point thereof.

As used herein, the term "restriction unit" refers to a member for restricting the relative position of the capillary in its radial direction with respect to the scanning unit to an appropriate position.

As used herein, the term "connection structure" refers to a combined portion of a microcolumn (or connector) and a structure (such as a capillary) to be connected to the microcolumn (or connector). If the connection structure occupies a small proportion of the overall structure, such as when it is incorporated in a part of the tubing of an LC system, the connection structure is a structure that exists in the region between the ends of the microcolumn (or connector).

As used herein, the term "connector" refers to a structure that can connect multiple capillaries together (including those in a connected state).

As used herein, the term "microcolumn" refers to a tubular structure having a small size (e.g., length of 4 cm or less) that includes an inner column tube in at least a portion of its interior. It can be used being connected to capillaries and can be provided with functionality such as separation. If an additional structure, such as the force-applying mechanism described herein, is further attached to the tubular structure, the portion including this additional structure in addition to the tubular structure may be referred to as a microcolumn. In one embodiment, insertion of an inner column tube inside the connector can form a microcolumn.

As used herein, "inner column tube" refers to a cylindrical or tubular structure at least a portion of which is positioned inside a tubular member. In one embodiment, the inner column tube contains packing material therein.

As used herein, an "intermediate tube" refers to a tubular structure that is at least partially sandwiched between two tubular structures, such as between the tubular member (located on the outside) of the microcolumns of the present disclosure and the capillary.

When describing a tubular structure herein, the term "length" is used with respect to the direction in which the hollow space extends, and the terms "perimeter", "outer diameter", and "inner diameter" are used with respect to the direction perpendicular to the direction in which the hollow space extends.

As used herein, the term "kit" refers to a unit provided with parts (e.g., microcolumns, capillaries, etc. of the present disclosure), usually divided into two or more compartments. Advantageously, the kit preferably includes manual or instructions describing how to use or manipulate the provided parts or the like.

As used herein, the term "about" refers to plus or minus 10% of the indicated value, unless otherwise defined. When "about" is used for temperature, it refers to the indicated temperature plus or minus 5° C., and "about" when used for pH, to the indicated pH plus or minus 0.5.

Preferred Embodiment

Preferred embodiments of the present disclosure are described below. The embodiments provided below are provided for a better understanding of the disclosure, and it is understood that the scope of the disclosure should not be limited to the following description. Therefore, it is clear that a person skilled in the art can make appropriate modifications within the scope of the present disclosure in light of the description in this specification. It is also understood that the following embodiments of the disclosure can be used singly or in combination.
(Scanning Unit)

First, as one aspect of the present disclosure, an embodiment of a scanning unit is presented. The present disclosure relates to scanning units, systems, and methods particularly useful for sample detection in capillary isoelectric focusing. However, it is not limited to sample detection in capillary isoelectric focusing and can be applied to other uses. The scanning unit according to the present disclosure is applicable to various detection schemes such as fluorescence detection, optical absorption detection, refractive index detection, and the like. Embodiments according to the present disclosure will be described in detail below with reference to the drawings. Like reference numbers refer to like parts throughout the drawings.

FIG. 1 is a perspective view of a scanning unit that is an example of scanning unit 110 according to the present disclosure. The scanning unit 110 includes an optical system unit 118 (see FIG. 2), a restriction unit 150, and a scanning base 114. The capillary 5 is configured to be restricted at an appropriate position by the restriction unit 150. The scanning unit 110 has an incident-side light transmission member connecting port 142 for transmitting incident-side light from a light source (not shown) existing outside the scanning unit through the light transmission member 102 into the optical system unit and is configured to irradiate the sample in the capillary 5 with the incident-side light from the light source via the incident-side light transmission member 102. The scanning unit 110 further includes an exit-side light transmission member connecting port 144 for transmitting the light from the sample to a photodetector (not shown) existing outside the scanning unit 110 and is configured such that the output-side light responded by the sample in the capillary 5 can be transmitted to the photodetector via the output-side light transmission member 106. Scanning unit 110 can move in a direction along capillary axis 12 by a drive mechanism (not shown) connected to scanning base 114. The sample in the capillary 5 can be scanned by continuously transmitting light as described above at each position on the capillary axis 12 while moving the scanning unit 110 along the capillary axis 12.

Figure 2:
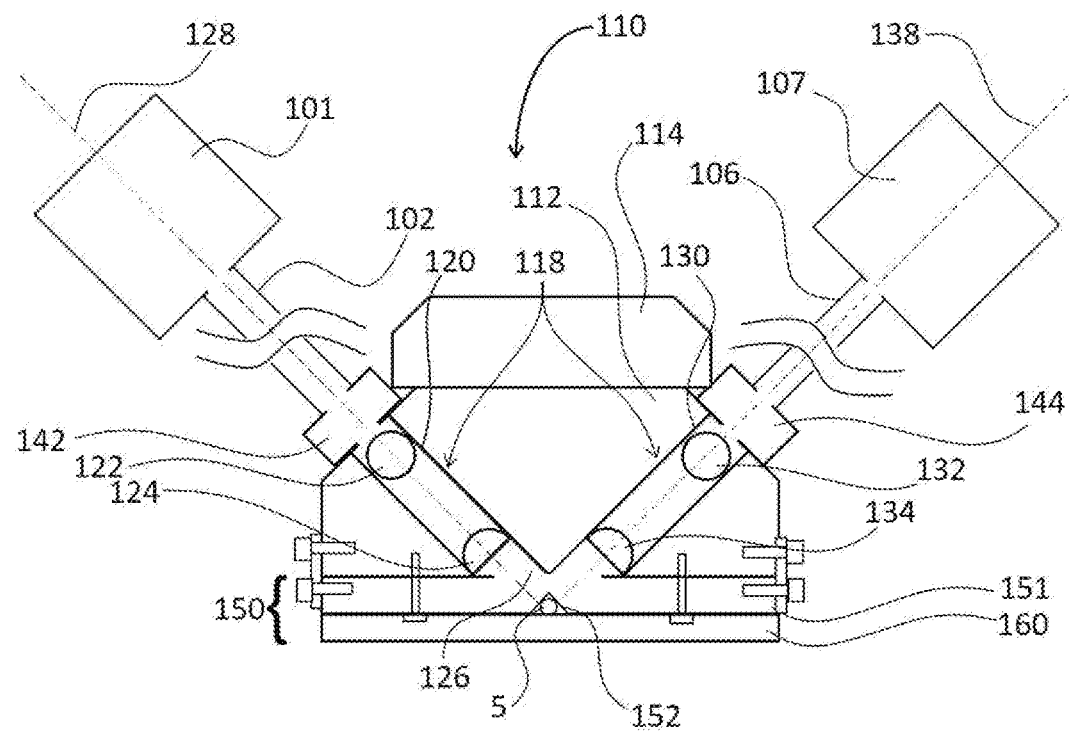
FIG. 2 is a horizontal sectional view of the first embodiment of a scanning unit according to the present disclosure.

FIG. 2 is a cross-sectional view of scanning unit 110 according to the present disclosure taken along line AA shown in FIG. 1. The scanning unit 110 includes an optical system unit 118, a restriction unit 150 that restricts the capillary at an appropriate position, a scanning base 114 that is moved by a drive mechanism, an incident side light transmission-member connecting port 142 to which an light transmission member 102 that transmits light from the light source 101 to the scanning unit, and an emitting side light transmission member connecting port 144 to which an light transmission member 106 for transmitting the light emitted from the capillary to the photodetector 107. In addition, in the embodiment shown in FIG. 2, the case including the incident-side light transmission member connecting port 142 and the exit-side light transmitting member connecting port 144 has been described, but the scanning unit according to the present disclosure is not limited to this. By installing the light source in the scanning unit 110 and directly irradiating the light from the light source to the capillary, or by directly irradiating the light from the light transmission member to the capillary, the incident side light transmission member connection port 142 can be eliminated. Also, by installing the photodetector in the scanning unit 110, the exit-side light transmission member connecting port 144 may be eliminated. When the capillary 5 is directly irradiated with light from the light transmission member, it is necessary to use a light transmission member with a small core-diameter to limit the irradiation region. When using an incident-side light transmission member with a large core diameter, or when installing a light source in a scanning unit, the optical system unit 118 (the first optical system 120 and/or the second optical system 130) is preferably used. (See FIG. 2). In this way, by providing the scanning unit 110 with the optical system unit 118 (see FIG. 2) and the restriction unit 150 that restricts the capillary to an appropriate position, it is possible to detect with a simpler device configuration and with higher accuracy compared with the conventional instrument equipped separately with incident-side optical system and the exit-side optical system. Moreover, compared with a conventional detector in which a capillary is moved, scanning by a scanning unit with a fixed capillary has the effect of making the device more compact.

The optical system unit 118 includes a first optical system 120 that transmits the incident-side light to the capillary 5 along a first optical axis 128, and a second optical system 130 that transmits the output-side light emitted from the capillary 5 along the second optical axis 138. An optical unit 118 may be housed within the housing 112. The first optical system 120 and the second optical system 130 may have different configurations, or a single optical system may transmit light on both the incident side and the output side. In a preferred embodiment, the first optical system 120 and the second optical system 130 have different structures to prevent mixing of light on the incident side and light on the output side.

The first optical system 120 may have one or more optical elements. Optical elements may include, for example, lenses, mirrors, prisms, beam splitters, filters, waveplates, or the like. Preferably, the optical elements in the first optical system 120 include an incident-side collimating lens 122 for collimating light and an incident-side condensing lens 124 for condensing light to irradiate the capillary 5 with the light transmitted by the light transmission member 102. The incident side collimating lens 122 can be, for example, a plano-convex lens, a biconvex lens, a ball lens, or a hemispherical lens. The incident-side condenser lens 124 can be, for example, a plano-convex lens, a biconvex lens, a concave-convex lens, or a ball lens. The incident-side condenser lens 124 can be, for example, a plano-convex lens, a biconvex lens, a concave-convex lens, a ball lens, or a hemispherical lens. The incident side condenser lens can be selected and arranged to have a focal length where light is focused at the position of the groove 152 that restricts the capillary 5.

A first optical axis 128 is formed by a straight line connecting the center of one or more optical elements and their focal points.

Second optical system 130, like first optical system 120, may have one or more optical elements. Optical elements may include, for example, lenses, mirrors, prisms, beam splitters, filters, waveplates, or the like. Preferably, the optical elements in the second optical system 130 may include an output-side collimating lens 132 and an exit-side condensing lens 134.

A second optical axis 138 is then formed by a straight line connecting the center of one or more optical elements and their foci.

Scanning by the scanning unit 110 may also be performed without precisely collimating the light. In such cases, the first optical system and the second optical system may each comprise only the incident-side condenser lens 124 and the output side condenser lens 134. In this example, the optical element comprises, for example, only a ball lens, by means of which the required light collection can be achieved.

First optical system 120 and second optical system 130 may be arranged such that first optical axis 128 and second optical axis 138 form an arbitrary angle. The angle between the first optical axis 128 and the second optical axis 138 can be determined by the design of the scanning unit, the light detection method, and the like. For example, in the case of fluorescence detection, since the fluorescence is emitted all around the capillary 5, any angle can be adopted except for the approximately 180-degree angle at which the light on the incident side enters the second optical unit. In one embodiment, the angle between the first optical axis 128 and the second optical axis 138 in fluorescence detection is about 45° to about 135°, preferably about 75° to about 105°, more preferably about 90°. By setting the angle between the first optical axis 128 and the second optical axis 138 to about 75° to about 105°, it is possible to make the device compact.

The scanning base 114 is connected to a drive mechanism (not shown) that moves it in the direction of the capillary axis 12. Scanning base 114 may be formed integrally with scanning unit 110, for example, although scanning bases according to the present disclosure are not limited so. For example, the scanning base 114 may be externally attached to the scanning unit 110, and the light source and the photodetector may be connected across the scanning base, or the scanning base 114 itself may function as the scanning unit 110 where the optical system unit 118 is incorporated in the scanning base 114.

Figure 3:
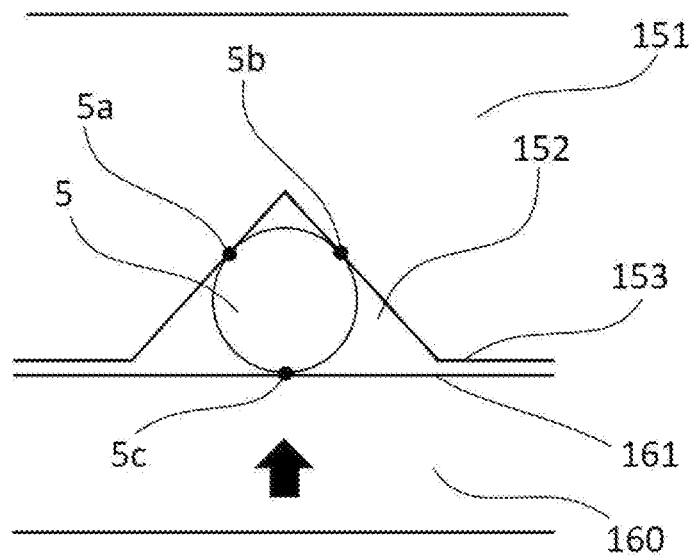
FIG. 3 is a top view of a contact surface between the restriction plate and the pressure plate in the first embodiment of a scanning unit according to the present disclosure.

The restriction unit 150 restricts the capillary 5 at an appropriate position within the scanning unit 110 to reliably irradiate the capillary 5 with light and to reliably detect the light emitted from the capillary 5. Specifically, the restriction unit 150 is configured to restrict the movement of the capillary 5 in the radial direction with respect to the scanning unit 110, but not to restrict the movement of the capillary 5 in the axial direction. The restriction unit 150 may have any configuration if it does not restrict the movement of the capillary 5 in the axial direction but restricts the movement in the radial direction. As the mechanism of the restricting unit, for example, a restricting plate 151 having a groove 152 as shown in FIG. 3 may be possible and a hole restrict radial movement of the capillary 5 may also be possible. The shape of the grooves or the shape of the holes can be arbitrary. For example, it may be a V-groove, a U-groove, a substantially circular hole, a substantially elliptical hole, or a substantially rectangular hole. However, a restriction unit according to the present disclosure are not so limited.

In this embodiment, the restriction unit 150 can include a pressure plate 160 in addition to the restriction plate 151. The restriction plate 151 has a groove 152 that restricts radial movement of the capillary 5 with respect to the optical system unit 118. The pressure plate 160 is coupled to the restriction plate 151 to sandwich the capillary 5 installed in the groove 152 together with the restriction plate 151, thereby fixing the radial position of the capillary.

The mechanism for fixing the pressure plate 160 to the restriction plate 151 may be arbitrary. For example, it can be fixed by magnetic force such as a magnet, mechanical force such as bolts and nuts, elastic force such as rubber, or adhesive force such as a snap-fit structure. Also, in another embodiment, the restriction unit 150 may be formed with a single plate having a hole that restrict radial movement of the capillary relative to the optical system unit.

The groove or hole that restricts the radial movement of the capillary can have any shape, size, material, and the like. FIG. 3 is an enlarged view of the vicinity of groove 152 in FIG. 2. In this embodiment, groove 152 has a V-shaped cross-section. The groove 152 can be designed to have a cross-sectional shape such that the capillary 5 protrudes slightly from the restriction plate side contact surface 153. As a result, when the pressure plate 160 and the restriction plate 151 are coupled, the pressure plate 160 presses the capillary 5, and the capillary 5 contacts the two points 5a and 5b in the groove 152 and a single point at the contact surface on the pressure plate side 161. The contact at three points 5a, 5b and 5c reliably restricts the movement of capillary 5 in the radial direction. Also, the grooves may be provided in the pressure plate 160 or may be provided in both the restriction plate 151 and the pressure plate 160.

The restriction of the capillary 5 by the restricting unit 150 restricts the movement of the capillary 5 in the radial direction as much as possible, but it is preferable to fix it so that the movement in the axial direction is as smooth as possible. By doing so, it becomes possible to perform the scanning of the scanning unit smoothly and to perform the light detection of the capillary with high accuracy. For this purpose, for example, the surfaces of the portions of the restriction plate 151 and/or the pressure plate 160 that are in contact with the capillaries 5 have a smooth surface and are preferably made of highly lubricious materials such as fluororesin and ultrahigh molecular weight polyethylene.

Figure 4:
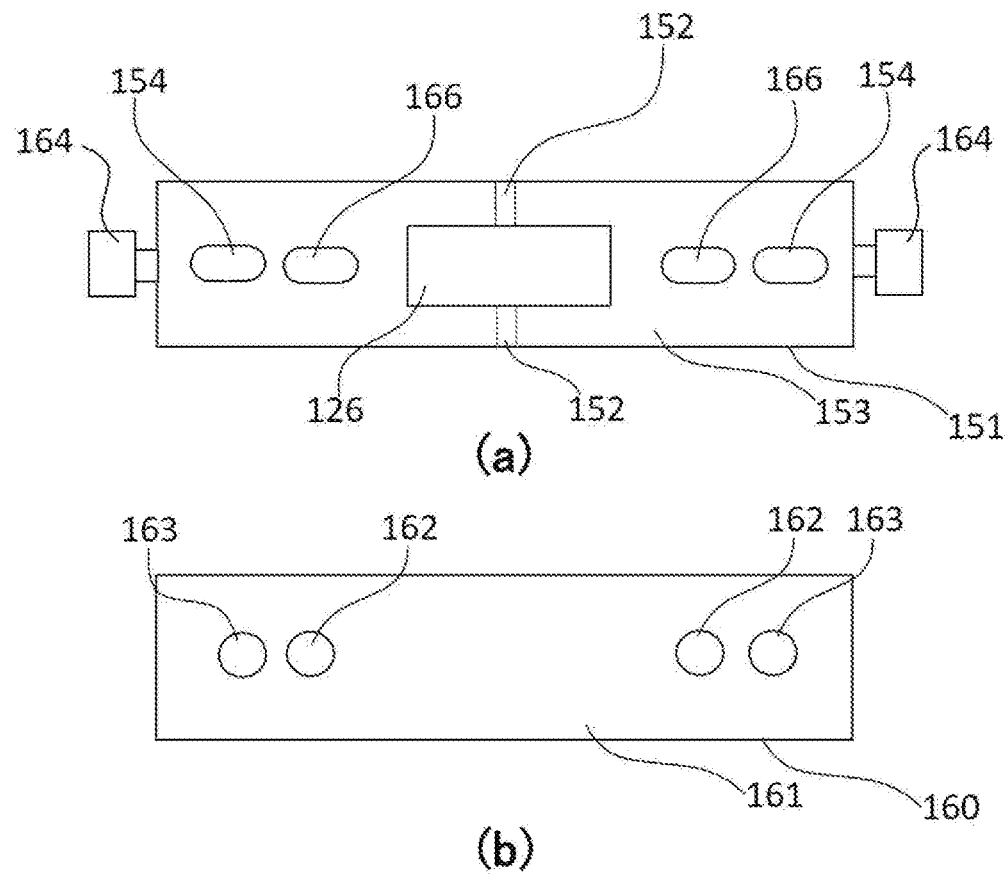
FIG. 4 is an exemplary plan view of the restriction plate-side contact surface and the pressure plate-side contact surface of a scanning unit according to the present disclosure.

FIG. 4 is an exemplary plan view of restriction plate side contact surface 153 and pressure plate side contact surface 161 of the contact surfaces of the two plates that constitute the restriction unit. FIG. 4(a) shows a plan view of the restriction plate side contact surface 153, and FIG. 4(b) shows the pressure plate side contact surface 161. The restriction plate side contact surface 153 can have an opening 126 for incidence and output of light at approximately the center thereof. The opening 126 is configured to communicate with the first optical system 120 and allows light on the incident side to pass therethrough. The opening 126 is also configured to communicate with the second optical system 130 so that light on the output side can pass therethrough. Groove 152 may be positioned above and/or below the opening 126.

The restriction plate 151 can be configured to be fixable to the housing 112 that accommodates the optical system unit 118 by any means. In one embodiment, the restriction plate 151 may have a fastener through-hole 166 for passing a restriction plate fastener 165 fixing the restriction plate 151 to the housing 112. Preferably, the fastener through-hole 166 has a substantially rectangular shape whose longitudinal direction is the direction perpendicular to the capillary axis 12, as shown in FIG. 4. The pressure plate 160 may then have a hole 162 through which a wrench for tightening the restriction plate fastener 165 is passed. Further, the restriction plate 151 has a coupling portion 154 for coupling the housing 112 and the pressure plate 160, and the pressure plate 160 can also have a corresponding coupling portion 163. The coupling portions 154 and 163 have arbitrary structures for bringing the contact surfaces of the two plates into close contact with each other and coupling them, for example, magnetic force of magnet, fastening force of bolt and nut, and adhesive force of a snap-fit structure. In one embodiment, the coupling means is a magnet and coupling portion 163 has a hole into which the magnet is fitted. The coupling portion 154 is a through hole which the magnet receiving pin is passed. Preferably, as shown in FIG. 4, the coupling portion 154 has a substantially rectangular shape whose longitudinal direction is the direction perpendicular to the axis of the capillary. By making the fastener through-hole 166 and the connecting portion 154 substantially rectangular with the longitudinal direction perpendicular to the axis of the capillary as shown in FIG. 4, it becomes possible to respond flexibly to changes in the relative position of restriction unit 150 and optical system unit 118 in the position adjusting mechanism described later. Although the pressure plate side contact surface 161 is depicted as having the same area as the restriction plate side contact surface 153 in FIG. 4, but the pressure plate side contact surface 161 is at least large enough to cover the groove 152.

The scanning unit 110 may further include a position adjusting mechanism that changes the relative position between the restriction unit 150 and the optical system unit 118. A mechanism for changing the relative position between the restriction unit 150 and the optical system unit 118 may be any mechanism. For example, it may be a mechanism that relatively slides between the surface of the housing 112 that houses the optical system unit 118 and the surface of the restriction plate 151 of the restriction unit 150 that comes into contact with the housing, or a mechanism that provides a plurality of coupling positions so that the coupling positions can be changed on the coupling surface between the restriction unit 150 and the optical system unit 118.

Figure 5A:
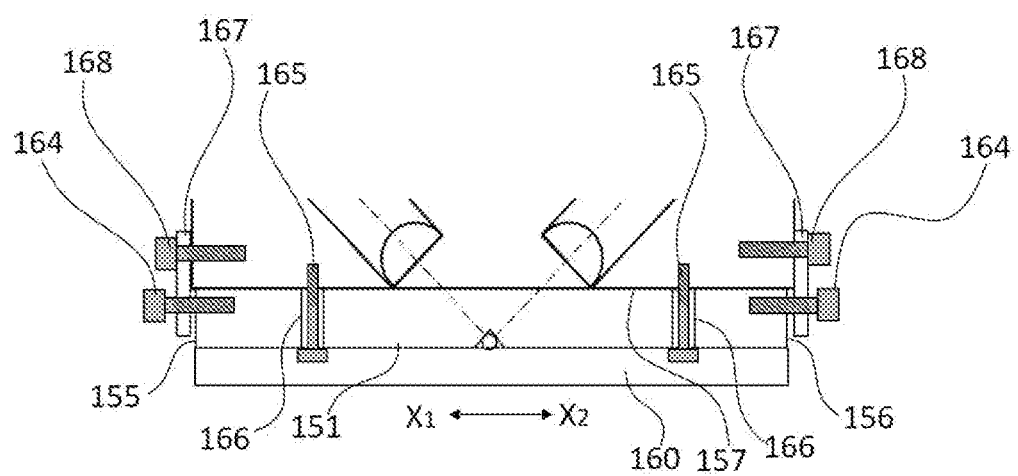
FIG. 5A is a horizontal cross-sectional view showing the first example of the position-adjustment mechanism by sliding movement for a scanning unit according to the present disclosure.

As shown in FIG. 5A, the position adjustment mechanism in scanning unit 110 can be configured as either restriction unit 150 or optical system unit 118 slides relative to each other along contact surface 157 where restriction unit 150 and optical system unit 118 contacts. Note that FIG. 5A is an enlarged view of the portion of the restriction unit 150 shown in FIG. 2. In this embodiment, the position adjustment mechanism includes a position adjuster screw 164 screwed to the restriction plate 151, a connecting member 167 connecting the position adjuster screw 164 and the housing 112, a restriction plate fastener 165, and a fastener through-hole 166 and a connecting member fastener 168. A restriction plate fastener 165 can connect the restriction plate 151 and the housing 112 through a fastener through-hole 166 provided in the restriction plate 151. Position adjusters 164 can extend from opposing sides 155 and 156 of restriction plate 151 toward the inside of restriction plate 151 via connecting members 167. The connecting member 167 has two holes, one through which the position adjuster 164 passes and the other through which the connecting member fastener 168 passes, by which the connecting member 167 can be fixed to the housing 112. The diameter of the fastener through hole 166 in the $X_1$-$X_2$ direction is set larger than the diameter of the restriction plate fastener 165, and the diameter of the fastener through hole 166 in the axial direction of the capillary is set equal to the diameter of the restriction plate fastener 165. Furthermore, since the width of restriction plate 151 is set smaller than the width of housing 112, driving position adjuster 164 moves restriction plate 151 in the $X_1$ or $X_2$ direction. With such a mechanism, minute position adjustment is possible, and simply by driving the position adjuster 164, the position can be easily adjusted with respect to the optical axis.

Figure 5B:
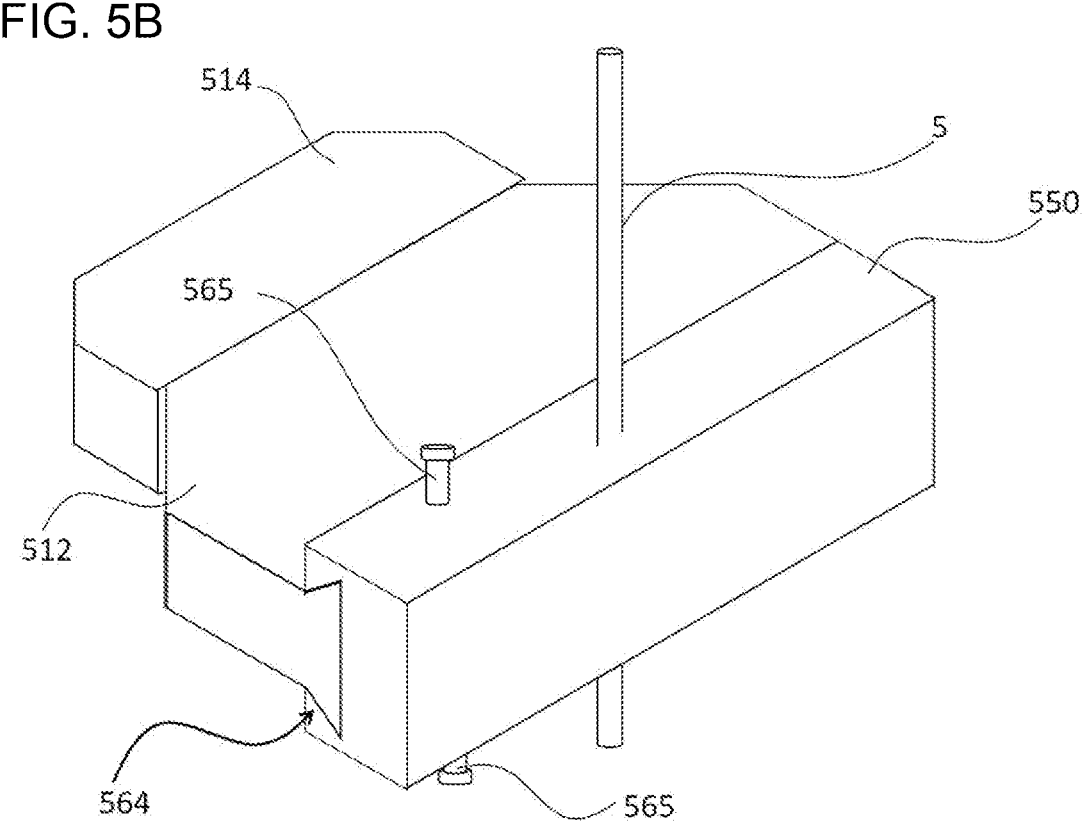
FIG. 5B is a perspective view showing the second example of the position-adjusting mechanism by sliding movement for a scanning unit according to the present disclosure.

Other examples of the position adjusting mechanism by sliding movement include, for example, a mechanism including a dovetail groove and a stopper, or a mechanism including a rail and a stopper. FIG. 5B shows a scanning unit equipped with a sliding-type position adjusting mechanism using dovetail grooves, which is a second example of a position adjusting mechanism by sliding movement of the restriction unit. The scanning unit has a dovetail groove 564 on the contact surface between the housing 512 and the restriction unit 550. By sliding movement of restriction unit 550 relative to housing 512 along dovetail groove 564, the relative position between restriction unit 550 and the optical system unit changes. When determining the relative position, it is possible to stop the slide movement by tightening the stoppers 565 provided on the top and bottom surfaces of the restriction unit 550 and bringing them into contact with the dovetail grooves from above and below.

Figure 5C:
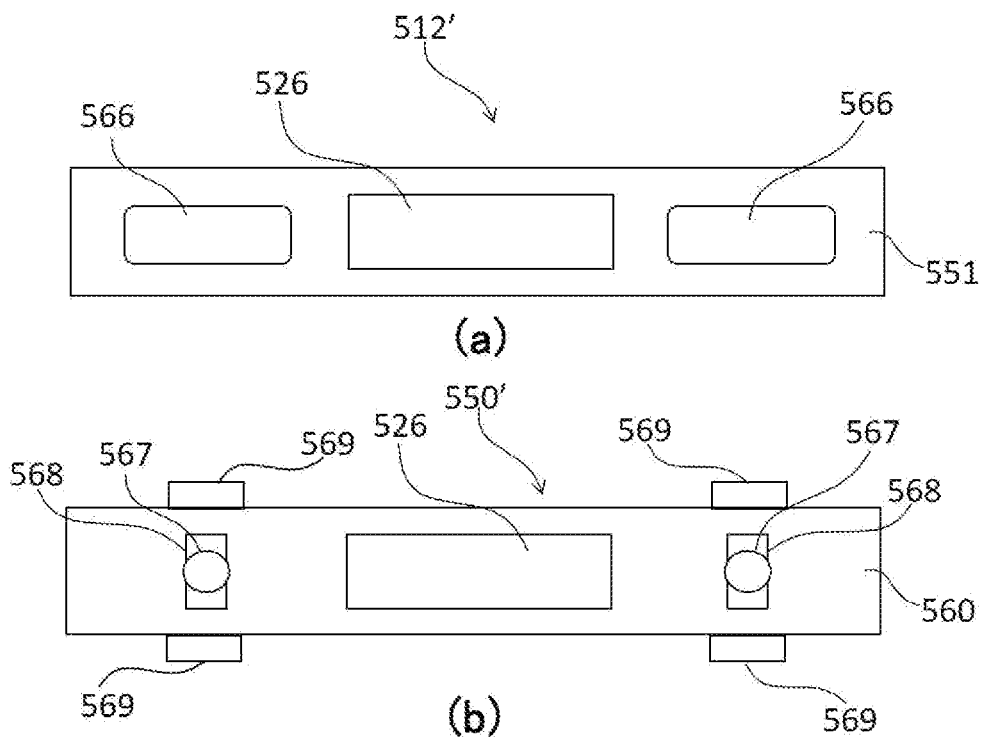
FIG. 5C is a plan view showing the third example of the position-adjusting mechanism by sliding movement for a scanning unit according to the present disclosure.

Also, FIG. 5C shows a third example of a position adjustment mechanism by sliding movement of the restriction unit, that is, a restriction unit provided with a slide-type position adjustment mechanism using a rail, comprising contact surface 551(a) of the housing 512' and a contact surface 560(b) of the restriction unit 550' with the housing 512'. The contact surface 551 includes two recessed rails 566 outside the opening 526. The contact surface 560 is provided with two protrusions 567 and stoppers 568 attached to the periphery of the protrusions. The stopper 568 is configured to be retracted into the protrusion 567 by pressing two buttons 569 provided on the upper and lower sides of the contact surface 560 toward the inside of the contact surface 560. By inserting the protrusion 567 into the rail 566 while the stopper 568 is retracted and sliding the restriction unit 550' along the rail 566, the relative position between the restriction unit 550' and the optical system unit is changed. When determining the relative position, releasing the button 569 leads the stopper 568 to push the wall surface of the rail 566, and the movement of the protrusion 567 with respect to the rail 566 can be stopped. Other sliding mechanisms are also applicable.

As shown in FIG. 2, scanning unit 110 receives light from light source 101 through light transmission member 102. The light transmission member 102 is connected to the incident-side light transmission member connecting port 142 of the scanning unit 110. Light source 101 can be, for example, a laser, a light emitting diode, or a lamp. The light transmission member 102 can be, for example, an optical fiber with a core diameter of about 50 to about 400 μm, such as an optical fiber with a core diameter of about 50 μm, about 100 μm, about 200 μm, or about 400 μm. The incident-side light transmission member connecting port 142 can communicate with the first optical system unit 120. The incident light on the first optical system unit 120 can irradiate the capillary 5 via the optical element therein. Light emitted from capillary 5 in response to irradiation may enter second optical system unit 130. Then, the light is emitted from the output-side light transmission member connecting port 144 communicating with the second optical system unit 130, and the light can be transmitted to the photodetector 107 via the light transmission member 106. The optical transmission member 106 can be, for example, an optical fiber. Preferably, the optical fiber as the light transmission member 106 has a core diameter larger than the core diameter of the optical fiber as the light transmission member 102 on the incident side. By doing so, it is possible to prevent interference with light transmission due to a slight deviation between the optical axis 138 on the output side and the restricted position of the capillary. The optical fiber on the output side preferably uses an optical fiber with a core diameter of about 400 to about 1000 μm, for example, an optical fiber with a core diameter of about 600 μm. The light detection method may be, for example, fluorescence detection, refractive index detection, light scattering detection, UV absorption detection, or the like, preferably fluorescence detection with high detection sensitivity. Photodetector 107 can be, for example, a photomultiplier tube, a photodiode, an avalanche photodiode, or a multi-pixel photodetector.

Figure 6:
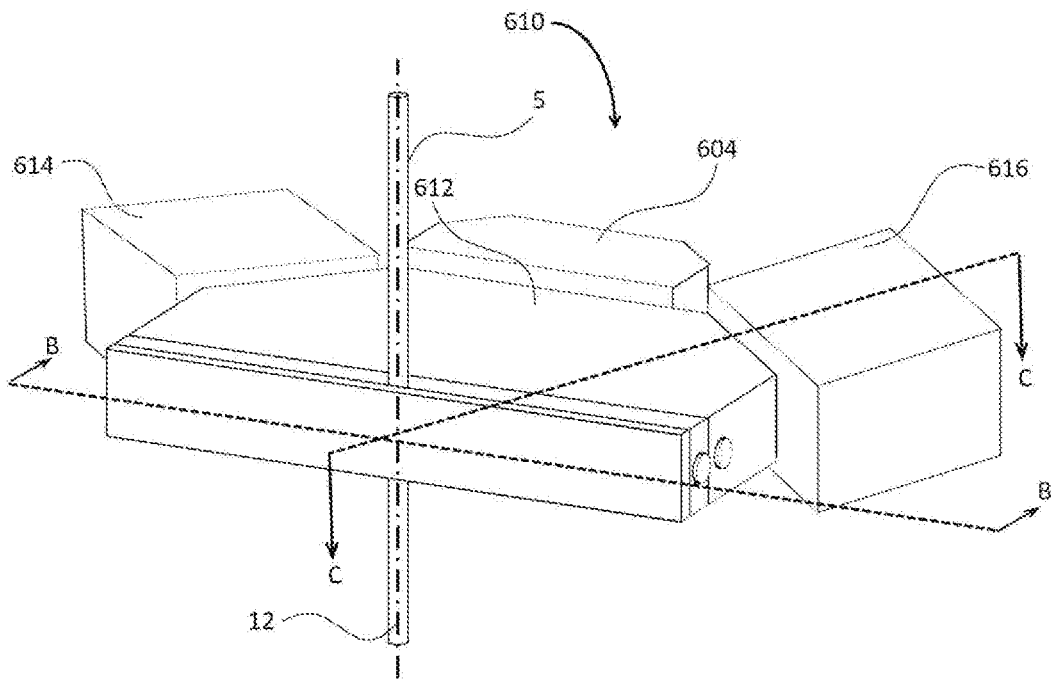
FIG. 6 is a perspective view of the second embodiment of a scanning unit according to the present disclosure.

As a second embodiment of a scanning unit according to the present disclosure, scanning unit 610 is shown in FIG. 6. The scanning unit 610 does not include the incident-side light-transmission-member connecting port 142 and the exit-side light-transmission-member connecting port 144 like the scanning unit 110 shown in FIG. 1. The scanning unit 610 may comprise housings and contain an optical system unit, a light source, and a photodetector within the housings. For example, the scanning unit 610 comprises a first housing 612, a second housing 614 and a third housing 616, wherein the first housing 612 contains the optical system unit, the second housing 614 contains the light source, and the third housing 616 contains a photodetector. In this manner, the optical system unit, light source, and photodetector can be housed in separate housings, allowing selection of the appropriate optical system unit, light source, and photodetector depending on the application and how the light is detected to customize the scanning unit 610. In another example, a single housing may contain the optical system unit, light source, and photodetector. In yet another example, the scanning unit may have a first housing containing the optical system unit and a second housing containing the light source and photodetector.

Figure 7:
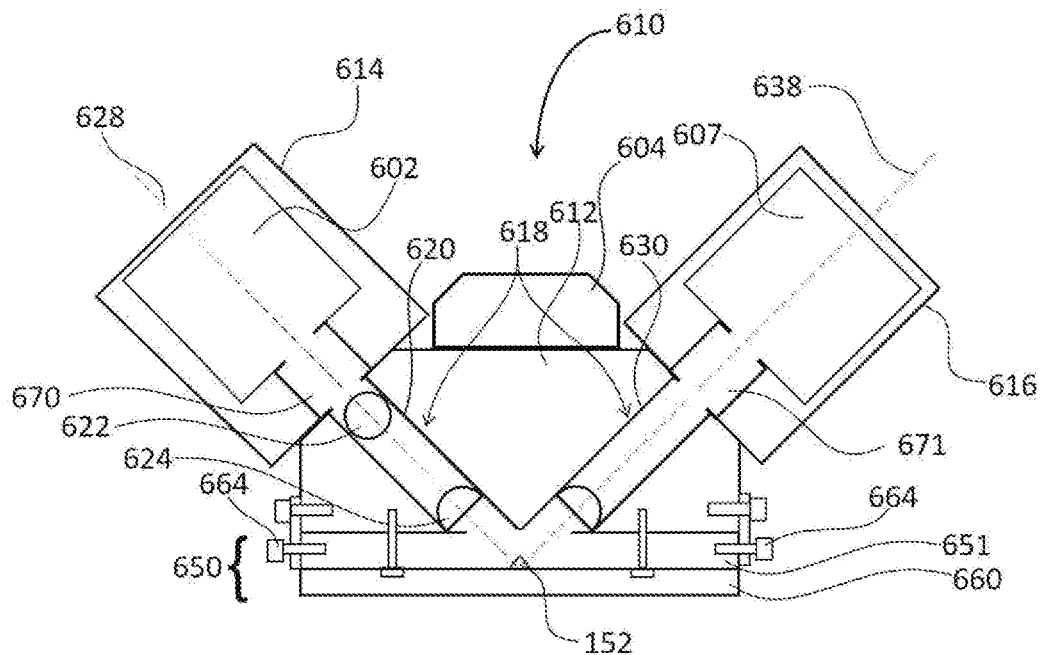
FIG. 7 is a horizontal cross-sectional view of the second embodiment of a scanning unit according to the present disclosure.

FIG. 7 is a cross-sectional view of the scanning unit 610 taken along line BB shown in FIG. 6. Scanning unit 610 includes light source 602 in the second housing and photodetector 607 in the third housing. The light source 602 is arranged along a first optical axis 628 to be connected to the first optical system 620, and the photodetector 607 is arranged along a second optical axis 638 to be connected to the second optical system 630. To select the light to be irradiated to the capillary 5 and the light to be detected, it is preferable to arrange an incident-side filter unit 670 between the light source 602 and the first optical system 620, and an output-side filter unit 671 between the photodetector 607 and the optical system 630. The incident side filter unit 670 and the output side filter unit 671 may each comprise one or more optical filters. Optical filters may include, for example, bandpass filters, long pass filters, short pass filters, cold mirrors, hot mirrors, notch filters, colored glass filters, dichroic filters, ND filters, or the like. The incident side filter unit 670 can be housed in the second housing 614 together with the light source 602, and the output side filter unit 671 can be housed in the third housing 616 together with the photodetector. Filter units 670 and 671 may be housed in the first housing along with the optical unit.

Figure 8:
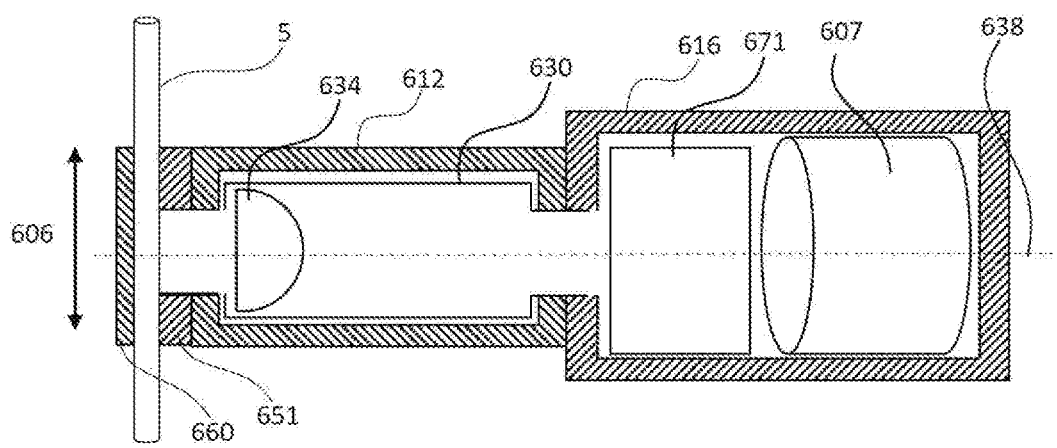
FIG. 8 is a vertical sectional view of the second embodiment of a scanning unit according to the present disclosure.

FIG. 8 is a cross-sectional view of scanning unit 610 taken along line CC shown in FIG. 6. First housing 612 accommodates second optical system unit 630, and third housing 616 accommodates filter unit 671 and photodetector 607. Both ends of the second optical system unit 630 and both ends of the first housing 612 are open, and light emitted from the capillary 5 passes through the second optical system unit 630. The light then enters third housing 616 through an opening at one end of third housing 616. The light passes through the output side filter unit 671 and reaches the photodetector 607. The incident side cross-section may have a similar configuration. By transmitting the light emitted from the second optical system unit 630 to the photodetector 607 without passing through the light transmission member in this way, attenuation of the light that occurs when passing through the light transmission member can be minimized. In addition, by directly connecting to a photodetector with a large photosensitive area, the accuracy required for optical system design, assembly, and optical axis adjustment can be reduced compared to the case where light is introduced into the end face of the light transmission member.

In addition, as shown in this embodiment, when the light on the output side is transmitted directly to the photodetector without passing through the light transmission member, the output light beam of the second optical system 630 does not need to be focused to a small spot. Therefore, in such a case, a configuration including only the condensing lens 634 (for example, a hemispherical lens or a ball lens) may be used.

Also, as shown in FIG. 6, preferably, a first housing 612 containing an optical system unit 618 (see FIG. 7) can be configured separately from a third housing 616 containing a photodetector having a large size such as a thickness. By doing so, it is possible to reduce the thickness of the scanning unit 610 (the first housing 612 that houses the optical system unit 618) in the capillary axial direction 12, and as a result, it has the effect to be possible to widen the scanning region. In the capillary axial direction 12, the first housing 612 can be constructed thinner over its entirety than the third housing. If only a portion of the first housing 612 is thin, among the scanning unit (the first housing 612 and/or the restriction unit 650 (see FIG. 7)), at least the thickness of the region in contact with the capillary is required to be thinner than the thickness of the third housing to achieve the purpose of high-precision detection by widening the scanning region of the present invention. The thickness of scanning unit 610 (first housing 612) in scanning direction 606 (see FIG. 8) is preferably about 70% or less of the thickness of the third housing. Also, the thickness of scanning unit 610 (first housing 612) is preferably about 1 cm or less. In the embodiment shown in FIG. 7, although the second housing 614 that houses the light source 602 is separated from the first housing 612, the first housing 612 and the second housing 614 can be integrated as far as the thickness of the first housing 612 is kept to be the same as the case of separate configuration.

In the first embodiment, an embodiment including an incident-side light transmission member connection por and an exit-side light transmission member connection port was described. In the second embodiment, a light source and a photodetector were directly coupled with the optical system unit. Another possibility is either the incidence and output sides of the scanning unit has a light transmission member connection, and the other is directly connected to a light source or photodetector. These configurations may be determined by factors such as space constraints, the type and size of the light source and photodetector used, experimental objectives, and the like.

Figure 9:
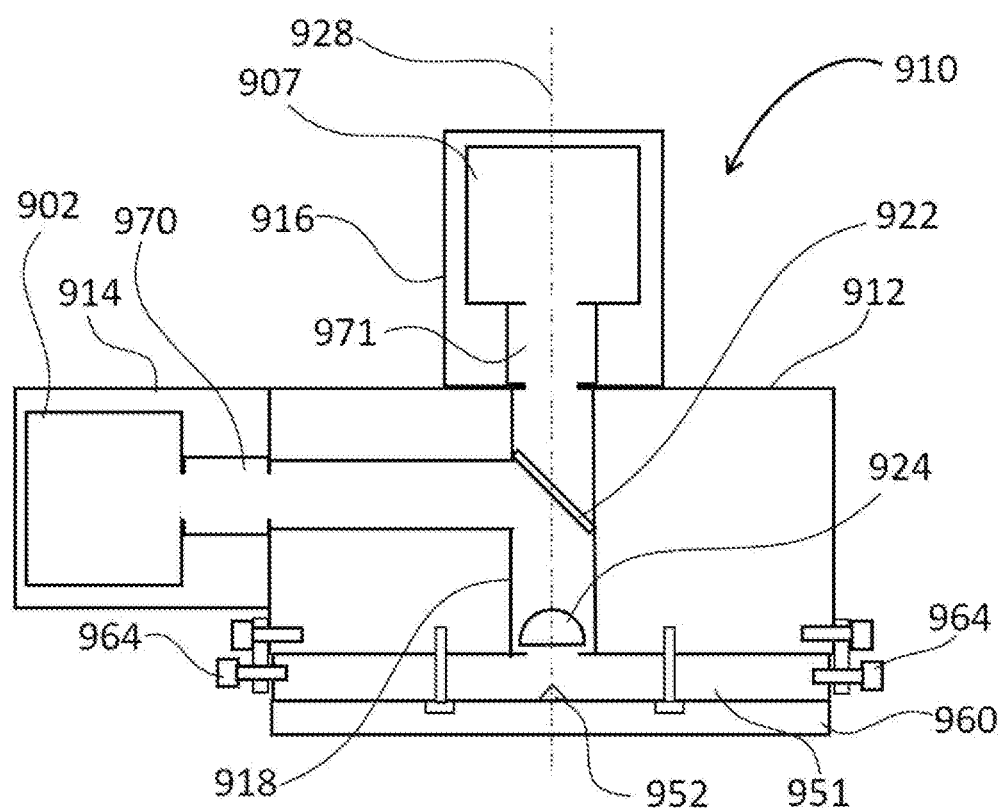
FIG. 9 is a horizontal cross-sectional view of the third embodiment of a scanning unit according to the present disclosure.

FIG. 9 shows a horizontal cross-sectional view of a scanning unit 910 as a third embodiment of the scanning unit according to the present disclosure. The scanning unit 910, like the scanning unit 610, includes a first housing 912, a second housing 914, and a third housing 916, each containing an optical system unit 918, a light source 902, and a photodetector 907.

The optical unit 918 in the scanning unit 910 transmits light along an optical axis 928 on both the incident side and the output side. The optical unit 918 may include a mirror 922 and a condenser lens 924. The light from a light source 902 enters the optical unit 918 through a filter unit 970. The light on the incident side can be reflected by a mirror 922 downward in the figure along the optical axis 928. The reflected light is condensed by a condenser lens 924 and applied to the capillary installed in groove 952. The light exiting the capillary passes through the condenser lens 924 again and is transmitted along the optical axis 928 to the mirror 922. The mirror 922 is a mirror or filter that reflects light of wavelengths including light on the incident side and transmits light of wavelengths including light on the output side, and may be, for example, a dichroic mirror or dichroic filter. The output light passes through the mirror 922 and a filter unit 971 and reaches a photodetector 907. By using such an optical unit 918, it is possible to prevent the light on the incident side from being detected by the photodetector even when the optical axes of the incident side and the output side coincide. In the embodiment shown in FIG. 9, the optical system unit 918 is arranged such that the optical axis 928 is substantially orthogonal to the regulation plate 951, but the optical system unit according to the present disclosure is not limited to this. The optical axis 928 should be substantially perpendicular to the axis of the capillary, but not necessarily substantially perpendicular to the restriction plate 951.

(Sample Detection System)

Figure 10:
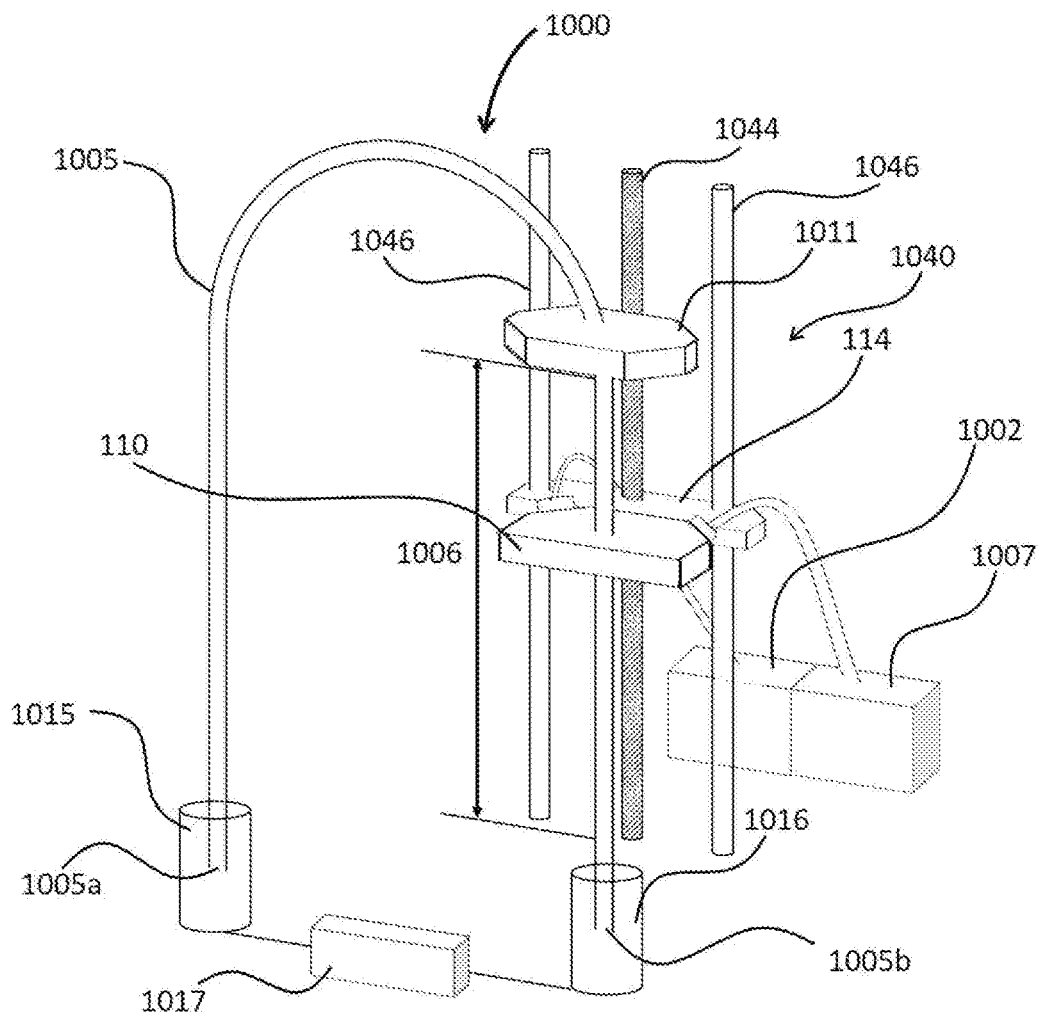
FIG. 10 is a perspective view of a sample detection system using a scanning unit according to the present disclosure.

Next, a sample detection system using the scanning unit according to the present disclosure will be described. FIG. 10 shows a sample detection system 1000 using scanning unit 110. System 1000 can include capillary 1005, light source 1002, scanning unit 110, fluorescence detector 1007, anolyte 1015, catholyte 1016, power supply 1017, boundary detector 1011, and scanning unit drive mechanism 1040.

Capillary 1005 can be made of any material, such as fused silica, borosilicate glass, fluorine-doped silica glass, borosilicate crown glass (BK7), rare earth-containing glass, etc., but a fused silica capillary is preferred because it has excellent corrosion resistance, low electrical conductivity, and high transparency. Capillary 1005 may have any inner diameter, but preferably about 1 to about 500 most preferably about 10 to about 100 so as to sufficiently dissipate Joule heat accompanying application of high voltage. Capillary 1005 has a scanning region 1006 over part of its length. If capillary 1005 is, for example, a fused silica capillary, the coating (such as polyimide coating) on the surface of capillary 1005 in the scanning region 1006 can be removed to expose a transparent surface to facilitate scanning. The scanning region 1006 is preferably a straight portion of the capillary 1005 in order to allow the scanning unit to scan linearly. Furthermore, region 1006 is preferably a straight portion on the cathode side, because if the scanning region 1006 is the linear portion on the anode side of the capillary 1005, the linear portion on the cathode side of the capillary 1005 will be filled with the harsh alkaline catholyte, and deterioration of the coating on the inner wall of the capillary 1005 will be accelerated. In system 1000, capillary 1005 can be oriented vertically or horizontally, and the shape of the capillary can be any shape, such as straight or inverted U-shaped. However, since the total length of the capillary can be freely selected and a large amount of electrode solution can be used by arranging the opening of the electrode tank upward, the capillary 1005 is preferably arranged as an inverted U shape in the vertical direction.

To perform sample focusing by capillary isoelectric focusing, a first end 1005a of the capillary 1005 can be connected to the anolyte 1015 and a second end 1005b can be connected to the catholyte 1016. The capillary 1005 is filled with a separation liquid containing a sample and carrier ampholyte. In this situation, anolyte 1016 is preferably injected up to the upper end of scanning region 1006 in order to form a pH gradient only in the scanning region 1006 of the capillary 1005. After filling the anolyte into the capillary 1005, the anolyte 1015 and catholyte 1016 are connected to a power supply 1017 to create a voltage between them. This creates a pH gradient in the scanning region 1006 to perform capillary isoelectric focusing and focus the sample in the separation liquid. The power supply 1017 preferably applies voltage so as to keep the current within a certain range so that the temperature inside the capillary does not rise excessively due to electrophoresis, for example, the current is preferably 10 to 15 µA or less. System 1000 may also include a cooling device (not shown) that creates an air flow around capillary 1005 to prevent heat build-up within the capillary. The temperature of the cooling air is preferably about 10 to about 30 degrees.

The boundary detector 1011 can be used to detect the boundary position between the anolyte and the separation liquid during anolyte injection. The boundary detector 1011 can be a non-contact or contact type electrical conductivity detector, refractive index detector, absorbance detector, fluorescence detector, light scattering detector, etc., preferably it can be a non-contact electrical conductivity detector since it can be applied without restrictions on the material or the shape of the capillary 1005. The system 1000 may also include other boundary detectors in addition to the boundary detector 1011. By providing a plurality of boundary detectors, it is possible to detect changes in the flow rate during the injection process of the liquid, and to detect the occurrence of problems such as contamination of the injection liquid with particulate matter.

Scanning unit 110 slides while sandwiching capillary 1005 as described above. Scanning unit 110 is connected to light source 1002 and photodetector 1007 via light transmission members. System 1000 may also include scanning unit drive mechanism 1040. The scanning unit drive mechanism 1040 can be any drive mechanism that drives the scanning unit 110 to move axially along the capillary 1005, such as a screw drive, conveyor drive, cylinder drive, wire drive, or the like. The example scanning unit drive mechanism 1040 shown in FIG. 10 includes a drive shaft 1044, two guide rails 1046, and a motor. A drive shaft 1044 and two guide rails 1046 may extend vertically through the scanning base 114 of the scanning unit 110. The drive shaft 1044 can be, for example, a ball screw and can convert the rotary motion produced by the motor into linear motion. The two guide rails 1046 can be fixedly arranged to prevent horizontal or rotational movement of the scanning unit 110. Such a scanning unit drive mechanism 1040 enables the scanning unit 110 to slide along the capillary 1005 stably and regularly.

Figure 11:
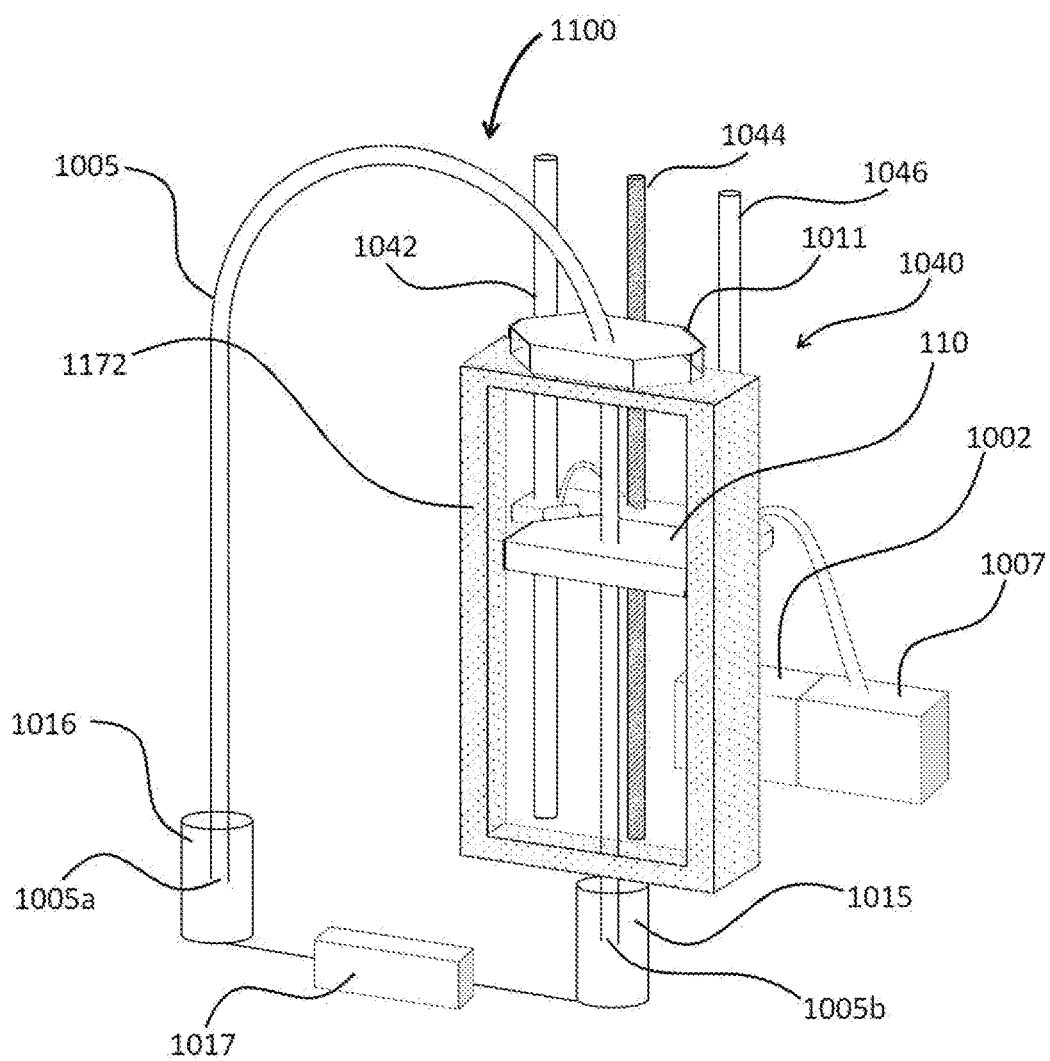
FIG. 11 is a perspective view of a sample detection system including a scanning unit according to the present disclosure and a frame surrounding the scanning region of a capillary.

FIG. 11 shows a system 1100 further comprising a frame 1172 surrounding the scan region 1006 of the capillary. The scanning region 1006 of the capillary is very fragile because the coating on the surface is removed. The frame 1172 is configured to enclose the scanning region 1006 of the capillary to reduce the risk of breakage during installation of the capillary 1005 into the system and to fix the capillary 1005 against movement of the scanning unit 110. In such an embodiment, the scanning unit 110 may be disposed within the frame 1172 and slide axially of the capillary 1005 within the frame 1172.

Systems 1000 and 1100 need not include all the components described above and shown in FIGS. 10 and 11. For example, if capillary isoelectric focusing has been previously performed and the sample in the capillary is already in focus, the sample detection system can only be used to scan the capillary and detect light. In such cases, the system need not include catholyte and anolyte. Furthermore, if the boundary positions of two or more solutions in the capillary are known, there is no need to have a boundary detector.

Although the system with reference to FIGS. 10 and 11 has been described using scanning unit 110, other scanning units may be used in similar systems. For example, a scanning unit 610 can have a configuration in which the light source and the photodetector are directly connected to the optical system unit as described in the second embodiment, and a scanning unit can have an optical transmission member connection port on one of the incident side and the output side and have a light source or photodetector directly connected on the other side.

It should be noted that methods of detecting a sample by capillary isoelectric focusing using the above system are also included in the present disclosure.

(Microcolumn)

Next, the microcolumn according to the present disclosure will be described. In one aspect, the present disclosure provides a connection structure comprising a connector or microcolumn and a plurality (e.g., two) of capillaries. In one embodiment, the connecting structure can be configured such that the microcolumn (or connector) and the capillary are in fluid communication. In one embodiment, the connection structure can be configured to be liquid-tight (to prevent liquid from flowing out from the interior of the structure to the exterior). In one embodiment, the connecting structure of the present disclosure may perform functions other than connecting multiple capillaries (e.g., functions of the microcolumns described herein such as separation and flow control). In one embodiment, in the connection structure of the present disclosure, the capillaries are positioned at predetermined intervals from each other.

The capillaries described herein can be commercially available, for example, as tubing for capillary electrophoresis and HPLC. Also, the capillary can be the capillary described herein above. The capillary has an outer diameter of, for example, about 0.05-5 mm, about 0.05 mm, about 0.1 mm, about 0.18 mm, about 0.2 mm, about 0.36 mm, about 0.5 mm, about 1 mm, about 2 mm, about 5 mm. can. A capillary can have an inner diameter of, for example, about 0.01-1 mm, about 0.01 mm, about 0.02 mm, about 0.05 mm, about 0.1 mm, about 0.2 mm, about 0.5 mm, about 1 mm, and the like. Capillaries can be made of fused silica or glass, for example. The capillary may be coated on the outside with polyimide or the like.

In one aspect, the present disclosure provides a microcolumn (or connector) or combination of a microcolumn (or connector) and a capillary (e.g., as a kit) for use in a connecting structure. In one embodiment, a microcolumn of the present disclosure comprises or consists of a connector and an inner column tube. In one embodiment, the microcolumn (or connector) comprises multiple openings, each receiving a separate capillary. The microcolumn (or connector) may receive capillaries with the same outer diameter or different outer diameters, with the size of the opening adjusted according to the outer diameter of the capillary.

In one embodiment, the microcolumns (or connectors) of the present disclosure are about 0.5 mm, about 1 mm, about 2 mm, about 5 mm, about 10 mm, about 20 mm, about 50 mm, or between any two thereof, for example, about 0.5-50 mm, about 1-50 mm, about 1-20 mm, about 1-10 mm. The microcolumns (or connectors) of the present disclosure may be easy to connect because few members may be required to form the connecting structure (e.g., only microcolumns and capillaries, or only connectors and capillaries), and the width for attachment of various members can be small. In one embodiment, the capillary-receiving opening of the microcolumn (or connector) of the present disclosure can have the inner diameter of the same as or of about 80% or more, about 90% or more, about 95% or more, about 98% or more, about 99% or more of the outer diameter of the capillary.

In one embodiment, a connector of the present disclosure comprises a tubular member. In one embodiment, a connector of the present disclosure includes a tubular member and a plurality (e.g., two) of intermediate tubes can be positioned within the tubular member, wherein the intermediate tubes positioned with a predetermined space apart from each other.

In one embodiment, a tubular member of the present disclosure is the same length as a microcolumn (or connector) of the present disclosure. In embodiments in which the microcolumn (or connector) of the present disclosure comprises an intermediate tube, at least a portion of the intermediate tube may protrude from the end of the tubular member. In one embodiment, the tubular members of the present disclosure can have the outer diameter of about 0.1 mm, about 0.2 mm, about 0.5 mm, about 1 mm, about 2 mm, about 5 mm, about 10 mm, or any range between two thereof, such as, about 0.1-10 mm, about 0.5-10 mm, about 0.5-5 mm. If no additional members are attached around the tubular member, the outer diameter of the tubular member can be the outer diameter of the connecting structure, so the connecting structure of the present disclosure can be formed in very little space and allows highly flexible piping. In one embodiment, the tubular members of the present disclosure can have the inner diameter of about 0.05 mm, about 0.1 mm, about 0.2 mm, about 0.5 mm, about 1 mm, about 2 mm, about 5 mm, or ranges between any two thereof, such as, about 0.05-5 mm, about 0.1-5 mm, about 0.2-2 mm.

In one embodiment, the tubular member of the present disclosure can be a heat shrinkable material. Heat-shrinkable materials include, but are not limited to, polyethylene, polyvinyl acetate, ethylene methacrylate copolymer, polypropylene, and the like, and any known heat-shrinkable material can be used. As a heat-shrinkable material, for example, when a rod-shaped molded product with a diameter of 1 mm is heated at 150° C. for 10 minutes, the material that shrinks to about 90% or less, about 80% or less, or about 70% or less can be used. In one embodiment, tubular members of the present disclosure can be of flexible material. Flexible materials include, but are not limited to, silicone materials, fluor rubbers, urethane rubbers, butadiene rubbers, natural rubbers, and elastomers, and any known flexible materials can be used. As a flexible material that has a tensile modulus of elasticity of, for example, about 0.02 kgf/mm2, about 0.05 kgf/mm2, about 0.1 kgf/mm2, about 0.2 kgf/mm2, about 0.4 kgf/mm2, about 0.6 kgf/mm2, about 0.8 kgf/mm2, about 1 kgf/mm2 at 25° C. kgf/mm2, or a range between any two of these, e.g., about 0.02~1 kgf/mm2, about 0.05~0.6 kgf/mm2, about 1.0~0.4 kgf/mm2 can be used. As a flexible material, materials exhibiting a volume increase rate of about 20% or less, about 10% or less, or about 5% or less may be preferred, when a molding of 1 mm thick, 1 cm square is immersed in, for example, acetonitrile, ethyl acetate, ethanol, methanol, and water.

In one embodiment, the intermediate tube of the present disclosure comprises an opening that directly receives a capillary. This opening may be the opening positioned on the outer side (i.e., the side that directly receives the capillary) in the microcolumn, among the two openings in each of the two intermediate tubes. In one embodiment, the opening of the intermediate tube may be adjusted to have an inner diameter equal to or greater than the outer diameter of the capillary to facilitate insertion of the capillary. For example, the opening of the intermediate tube may be flared. In one embodiment, the intermediate tube (other than the opening) can have an inner diameter that is the same as or smaller than the outer diameter of the capillary and is about 70% or more, about 80% or more, about 90% or more, about 95% or more, about 98% or more, about 99% or more of the capillary outer diameter. In one aspect, the intermediate tube can be a means for adjusting the outer diameter of the capillary so that the tubular member can receive the capillary.

In one embodiment, the intermediate tube of the present disclosure can be made of fluororesin (e.g., polytetrafluoroethylene (PTFE), perfluoroalkoxyalkane (PFA), fluorinated ethylene propylene (FEP), ethylenetetrafluoroethylene (ETFE), TEFLON®, TEFZEL®, DELRIN®), polyetheretherketone (PEEK), polyetherimide (PEI), polyphenylene sulfide (PPS), polypropylene, sulfone polymers, polyolefins, polyimide, polyaryletherketone, and polyoxymethylene (POM). Preferably, the intermediate tube of the present disclosure is composed of a flexible and rigid fluororesin such as TEFLON® and is liquid-tight when receiving a capillary.

In one embodiment, the predetermined space between the intermediate tubes is about 0.5 mm, about 1 mm, about 2 mm, about 5 mm, about 10 mm, about 20 mm, about 50 mm, or between any two thereof, for example, about 0.5-50 mm, about 1-50 mm, about 1-20 mm, about 1-10 mm. An inner column tube can be positioned in the predetermined space between the intermediate tubes, and in one embodiment, the length of the predetermined space is approximately equal to the length of the inner column tube (e.g., with a difference of about 10% or less, about 5% or less, about 2% or less, about 1% or less. Depending on the predetermined space between the intermediate tubes and the length of the inner column tube, the volume of packing material that can be held in the inner column tube increases, so it can be advantageous to make the predetermined space between the intermediate tubes and the inner column tube somewhat long. However, the longer the bed of the packing material is, the higher the pressure of the flow required to pass through it. It may be important to adjust this length to keep the pressure in a range that sustain the liquid-tight structure.

In one embodiment, the inner column tube may be made of glass, but the material is not particularly limited. In one embodiment, the inner column tube contains packing material. The packing material can be a packing material structure of columns used in HPLC systems and the like, such as a particulate packing material, a monolithic structure, etc. Monolithic structures can be preferred because they generally can be operated at lower pressures compared to particulate packing structures. The packing material can also be that of columns used in affinity chromatography, ion exchange chromatography, reversed phase chromatography, normal phase chromatography, etc., to implement similar separation modes. Target molecule/affinity ligand combinations in affinity chromatography include biotin-binding proteins such as avidin and streptavidin/biotin, maltose-binding proteins/maltose, G proteins/guanine nucleotides, oligohistidine peptides/metal ions such as nickel or cobalt, glutathione-S-transferase/glutathione, DNA-binding protein/DNA, antibody/antigen molecule (epitope), antigen molecule (epitope)/antibody, antibody/protein A, antibody/protein G, antibody/protein L, lectin/sugar, calmodulin/calmodulin-binding peptide, ATP-binding protein/ATP, or estradiol receptor protein/estradiol. Since the inner column tube can be protected by the tubular member, no particular strength is required and the size ratio of the inner diameter of the inner column tube to that of the tubular member cab be about 95%, about 90%, about 80%, about 70%, about 60%, about 50%, and the like.

In one embodiment, the inner diameter of the tubular member (undeformed if deformable) is approximately equal to the outer diameter of the inner column tube (e.g., a difference of about 10% or less, about 5% or less, about 2% or less, about 1% or less). In one embodiment, the inner diameter of the tubular member is configured to be approximately equal to the outer diameter of the intermediate tube (e.g., a difference of about 10% or less, about 5% or less, about 2% or less, about 1% or less).

In one embodiment, the inner diameter of the inner column tube is configured to be large. Since packings may be contained inside the inner column tube, it may be preferable to increase the inner diameter of the inner column tube to improve the adsorption and separation performance of the packings and/or to reduce the pressure increase required for flow due to the presence of the packings. In one embodiment, the inner diameter of the inner column tube can be configured to be larger than the inner diameter of the capillary. In one embodiment, the inner diameter of the inner column tube can be further configured to be larger than the inner diameter of the intermediate tube. In this embodiment, the inner diameter of the intermediate tube is approximately equal to the outer diameter of the capillary, so there is a risk of the capillary being inserted inside the inner column tube. In one embodiment, the predetermined space between the intermediate tubes and/or the inner column tubes are configured so that the capillaries cannot reach them, thereby preventing the structure of the packing material from being destroyed by the capillaries. For this purpose, in one embodiment, the capillary is provided with a positioning device defining a position to be received in the intermediate tube. In one embodiment, the positioning device is a stopper attached to the capillary (e.g., a short cut (e.g., about 1 mm) from a tubular structure having an inner diameter capable of receiving the capillary), or an indicator put on the capillary (for example, a line, recess, or protrusion provided on the capillary surface).

In one embodiment, the inner diameter of the inner column tube can be configured to be smaller than the outer diameter of the capillary. In this embodiment, no capillary is inserted inside the inner column tube, so positioning device may not be necessary. In this embodiment, a predetermined space is formed between the capillaries for the length of the inner column tube.

In one embodiment, the microcolumn (or connector) of the present disclosure further comprises force applying mechanism for applying an external force to the tubular member (for example, around the tubular member), and the force applying mechanism exerts an external force to deform the tubular member and expand or contract the predetermined space. For example, expansion or contraction of the predetermined space may involve deformation in a direction perpendicular to the axial direction of the microcolumn. The external force applied by the force applying mechanism may be a mechanical tensile force or a force utilizing a pressure difference generated inside and outside the tubular member through pressure manipulation around the tubular member, or the like. For example, the force-applying mechanism may include a member attached to the tubular member to pull mechanically the tubular member, a member attached to the periphery of the tubular member so as to create an airtight space around the tubular member, and a member that increases or decreases the air pressure in this airtight space (such as a cylinder or a pump connected in communication with the pressure regulating space). In this embodiment, the tubular member may be a flexible material as described above, such as a silicone material. By changing the volume of the predetermined space, it is possible to form a new flow path between the inner column tube and the tubular member while maintaining a liquid-tight state and to open possibilities for controlling the speed and direction of the flow in the capillaries and inside and outside of the inner column tube.

When a given space is expanded, a gap is created between the tubular member and the inner column tube, and since there is no packing material present in this gap, the resistance is low, and the flow can preferentially pass through this gap. For example, in a system in which a solid-phase extraction column (inner column tube) placed on the anode side is directly connected to isoelectric focusing separation, when the solid-phase extraction column is immersed in an acidic anolyte, and a voltage is applied to both ends, an electroosmotic flow is generated in the column in the direction to the anode, causing the problem that the sample and separation solution are pulled out of the capillary for isoelectric focusing toward the anode side. With the flow control described above, after eluting proteins from the solid-phase extraction column, if the gap is generated outside the inner column tube before voltage is applied, the flow of the liquid by electroosmosis circulates inside and outside the column, and the isoelectric focusing capillaries on the cathode side can be kept free of flow. In this embodiment, it is preferable that a channel is formed at the interface between the inner column tube and the intermediate tube, so that the length of the inner column tube may be shorter than the length of the predetermined space between the intermediate tubes, or channels can be formed between the inner column tube and the intermediate tube by providing grooves (e.g., radial grooves directed from the center to the periphery) in the end face of the intermediate tube that faces the inner column tube. In addition, when a predetermined space is contracted, the gap between the tubular member and the inner column tube disappears, the flow path outside the inner column tube is closed, and the flow path is switched only to the inside of the inner column tube. This condition can be also used. In one preferred embodiment, sulfonic acid groups can be attached to the outer wall of the inner column tube to direct electroosmotic flow towards the cathode under acidic conditions.

In one embodiment, the force applying mechanism comprises a pressure control member, and the pressure control member is a tubular member covering at least a predetermined space to form a pressure-controlled space between itself and the tubular member. The pressure control member can expand the predetermined space by reducing the pressure in the pressure controlled space and contract the predetermined space by pressurizing the pressure controlled space. In particular, the portion of the tubular member that covers the predetermined space can be made of a flexible material.

In one embodiment, the microcolumn (or connector) of the present disclosure does not include an additional member around the tubular member (e.g., a member that presses the tubular member from the outside). In another embodiment, the microcolumn (or connector) of the present disclosure may include an additional member (for example, a member that presses the tubular member from the outside) around the tubular member, thereby improving liquid tightness. In this embodiment, the tubular member may be the heat shrinkable material described above. In one embodiment, the tubular member can be configured (by heat shrinking) to partially cover the end of the intermediate tube, which can improve the pressure capacity of the microcolumn. For example, such a structure can be formed by inserting various members into a long tubular member, heat shrinking the tubular member, and then cutting the tubular member away from the end of the intermediate tube.

For ease of understanding, but not by way of limitation, specific embodiments of the present disclosure are described below with reference to the drawings.

Figure 12:
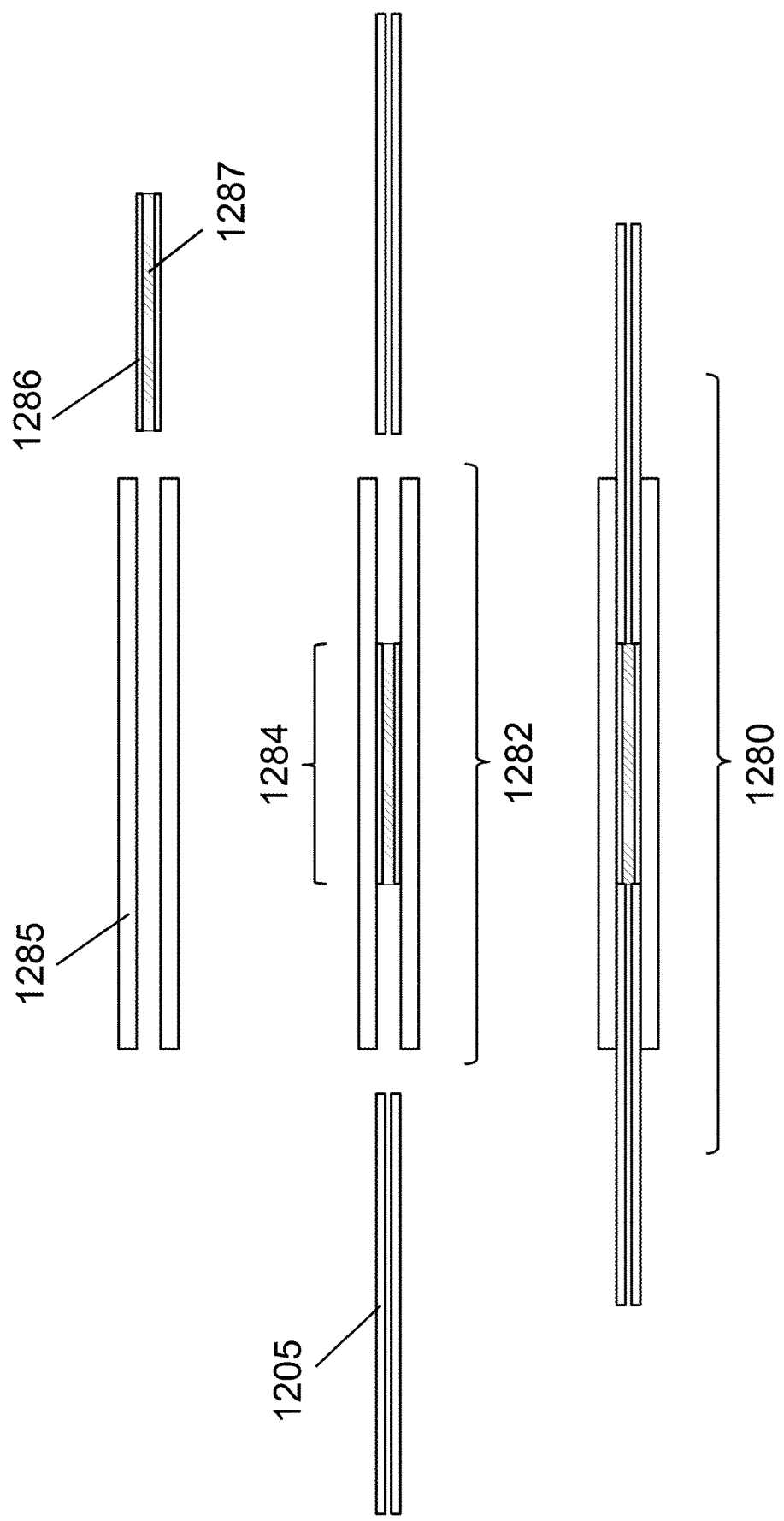
FIG. 12 illustrates an exemplary embodiment of a microcolumn and connecting structure of the present disclosure.

In FIG. 12, inner column tube 1286 containing packing material 1287 is inserted into tubular member 1285 to form microcolumn 1282, followed by capillary 1205 to form connecting structure 1280. Tubular member 1285 corresponds to the connector. A predetermined space 1284 is formed between the capillaries 1205 (the length of the inner column tube 1286). The outer diameters of both capillary 1205 and the inner column tube 1286 is the same as the inner diameter of the tubular member 1285, but the inner diameter of the inner column tube 1286 is made larger than the inner diameter of the capillary 1205 to increase the volume of the column.

Figure 13:
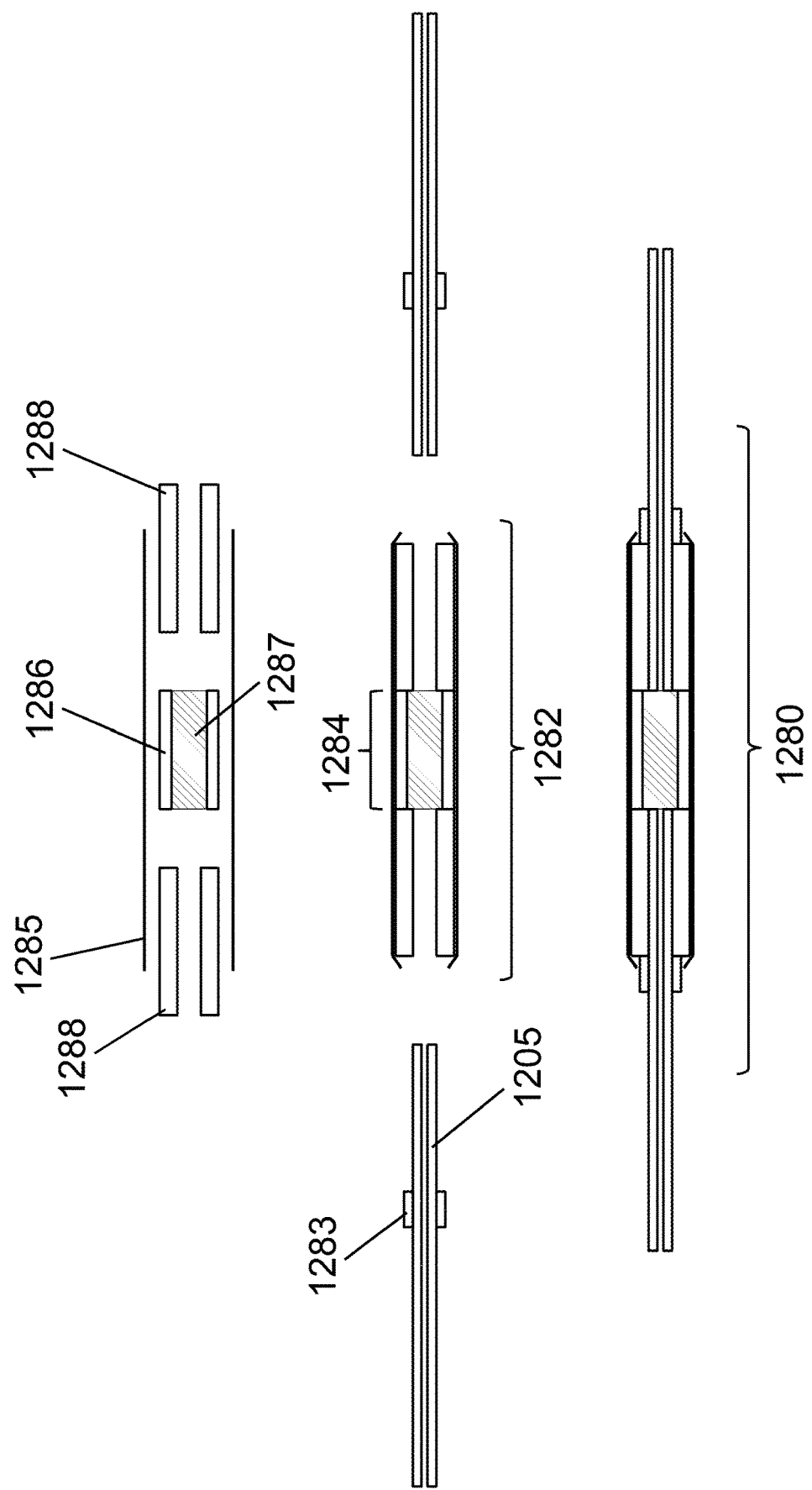
FIG. 13 illustrates an exemplary embodiment of a microcolumn and connecting structure of the present disclosure.

In FIG. 13, an inner column tube 1286 containing a packing material 1287 and an intermediate tube 1288 are inserted into a tubular member 1285 (heat shrinkable material), and heat is applied to shrink the tubular member 1285 to form a microcolumn 1282. After that, capillary 1205 with positioning device 1283 is inserted to form connecting structure 1280. Tubular member 1285 and intermediate tube 1288 form a connector. A predetermined space 1284 is formed between the intermediate tubes 1288 in which the inner column tube 1286 is positioned. The presence of positioning device 1283 prevents capillary 1205 from penetrating inside inner column tube 1286. Due to the heat shrinkage of tubular member 1285, tubular member 1285 partially covers the end of intermediate tube 1288.

Figure 14:
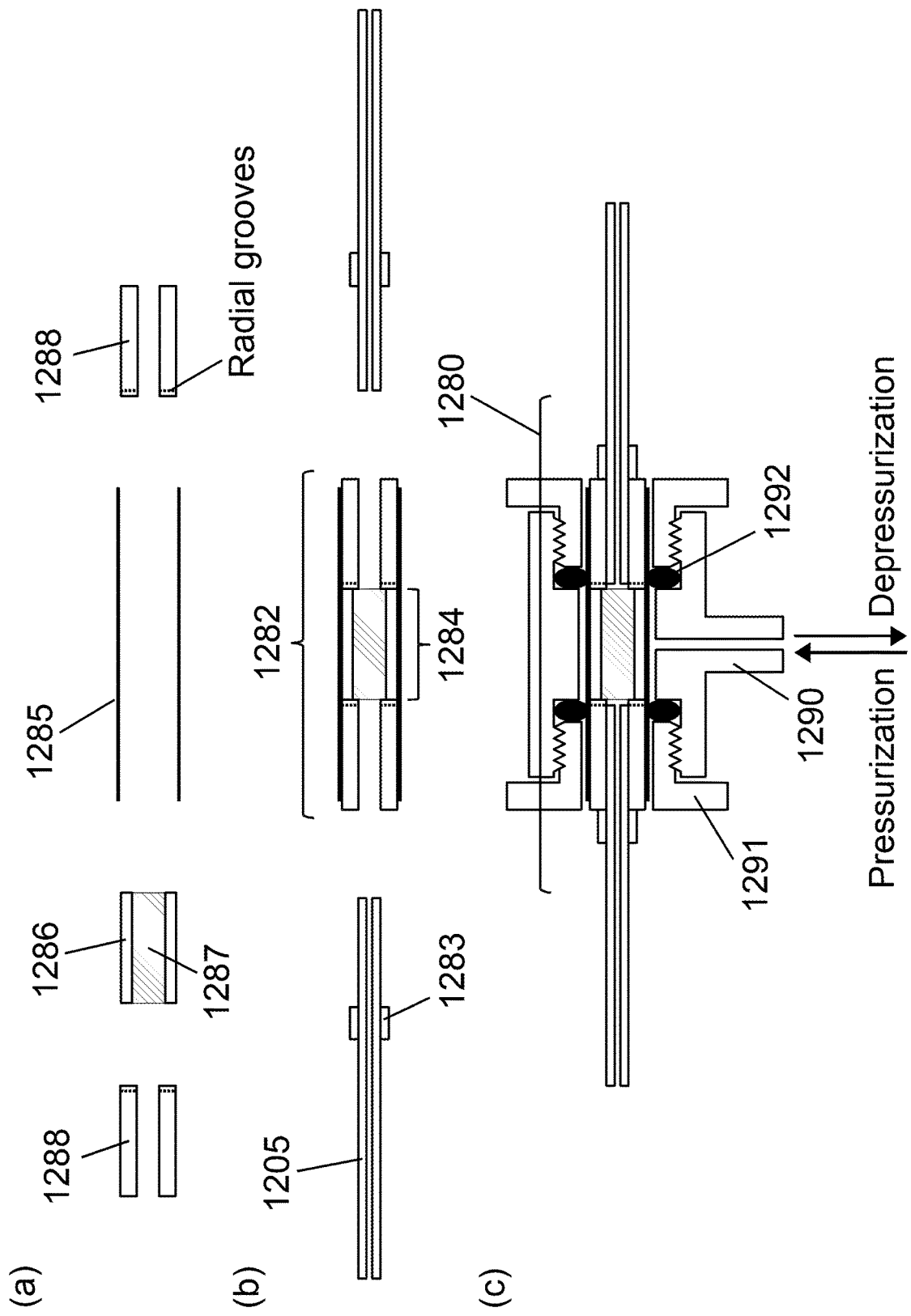
FIG. 14 illustrates an exemplary embodiment of a microcolumn and connecting structure of the present disclosure.

In FIG. 14, first, an inner column tube 1286 containing a packing material 1287 and an intermediate tube 1288 are inserted into a tubular member 1285 (flexible material) to form a microcolumn 1282 (a). After that, a capillary 1205 with positioning device 1283 is inserted to form a connecting structure 1280 (b). Next, a pressure control member 1290, an O-ring 1292 and a set screw 1291 are attached around the tubular member 1285 to form a microcolumn 1282 with pressure control mechanism (c). Tubular member 1285 and intermediate tube 1288 form a connector. A predetermined space 1284 is formed between the intermediate tubes 1288 in which the inner column tube 1286 is positioned. The presence of positioning device 1283 prevents capillary 1205 from penetrating inside inner column tube 1286. Pressure control member 1290, O-ring 1292 and set screw 1291 constitute force applying mechanism. A pressure controlled space is formed between the pressure control member 1290 and the tubular member 1285, and the volume of the predetermined space 1284 is increased or decreased by deforming the flexible tubular member 1285 by controlling the pressure. A channel is formed between the inner column tube 1286 and the intermediate tube 1288 by radial grooves provided at the end of the intermediate tube.

Further reference is made to FIG. 15 for the behavior of the microcolumn of FIG. 14 under pressure control. Here, it is assumed that a capillary for isoelectric focusing is connected downstream of the microcolumn (upper part of the figure). (A) In the state where the pressure control space is pressurized, only a channel passing through the inner column tube 1286 is formed near the internal column tube 1286. A target substance (such as protein) can be trapped in the packing material 1287 of the inner column tube 1286 by flowing the sample with a pump or the like. (B) When the pressure control space is depressurized, the predetermined space 1284 expands and a gap is formed between the tubular member 1285 and the inner column tube 1286, and the gap together with the radial grooves on the end face of the intermediate tube 1288 forms a new flow path. After the anolyte flows through the internal column tube 1286, the pressure is reduced at the start of electrophoresis, and voltage is applied in this state. The electroosmotic flow produced in the inner column tube 1286 flows through the grooves at the anodic side, through the outside of 1286, through the grooves on the cathodic side, and back into the inner column tube 1286. In this way, the effect of the electroosmotic flow on the isoelectric focusing capillary on the cathodic side can be eliminated. To further facilitate this situation, it may be a desirable option to attach sulfonic acid groups to the outer wall of the inner column to generate cathodic electroosmotic flow under acidic conditions.

(Method for Manufacturing Microcolumn) In one aspect, the present disclosure provides a method for manufacturing the microcolumn (or connector) of the present disclosure. In one embodiment, the manufacturing method can include inserting an intermediate tube into the tubular member. In one embodiment, the manufacturing method can include inserting an inner column tube into the tubular member. In one embodiment, the manufacturing method can include producing an inner column tube. In one embodiment, the inner column tube can be produced by placing a packing material (such as a particulate packing material) inside the inner column tube or forming a packing material (such as a monolithic packing material) inside the column tube. In one embodiment, the inner column tube is formed by a step of placing a packing material (such as a particulate packing material) inside the column tube or forming a packing material (such as a monolithic packing material) inside the column tube, and cutting the tube. For example, it may be preferable to cut a column tube having a monolithic packing material or the like formed therein so that the cross section of the packing material is aligned with the cross section of the column tube. When manufacturing the microcolumn (or connector) of the present disclosure, the inner/outer diameters of the tubular member, capillary, intermediate tube, inner column tube, etc. are appropriately selected to be entirely liquid-tight. Since heat and pressure can change the inner/outer diameter of tubular structures slightly, heat and/or pressure may be applied to tubular structures during the fabrication of microcolumns (or connectors) of the present disclosure. For example, when inserting an inner column tube into a tubular member, or inserting a capillary into an intermediate tube, widening the opening of the tubular member or the intermediate tube and/or heating the tubular member or the intermediate tube facilitates insertion. In one embodiment, when manufacturing the microcolumn (or connector) of the present disclosure using a tubular member made of a heat-shrinkable material, the method for manufacturing the microcolumn (or connector) may include heating the tubular member. The temperature of heating may be, for example, about 100° C., about 150° C., about 200° C., about 300° C., about 400° C., about 500° C., or a range between any two thereof, such as about 100° C. to 500° C., but can be appropriately set by those skilled in the art depending on the type of heat-shrinkable material.

(Use of Microcolumn)

The microcolumn (or connector) of the present disclosure can be used by connecting it to a capillary used for capillary electrophoresis, LC-MS, and the like. The microcolumn (or connector) of the present disclosure can be easily connected because it does not require the use of pressing means such as screws when connecting to the capillary. Since the microcolumn of the present disclosure can contain an adsorbent and/or a separating agent as a packing material, it can separate or isolate a specific substance, and can be suitably used in combination with various analytical procedure. Since it is not necessary to use a pressing means such as a screw when connecting with the capillary, the connection can be made easily. In one embodiment, the microcolumns of the present disclosure can be used under relatively low pressure, such as about 1 MPa or less, about 0.5 MPa or less, about 0.2 MPa or less, about 0.1 MPa or less, about 0.05 MPa or less, about 0.02 MPa or less, about 0.01 MPa or less.

(Note)

In this specification, "or ("matawa" in Japanese)" is used when "at least one or more" of the items listed in the sentence can be adopted. The same applies to "or ("moshikuwa" in Japanese)". When we say "within a range" of "two values" in this specification, the range includes the two values themselves.

The present disclosure will now be described with reference to the Examples, which are provided for illustrative purposes only, and not for the purpose of limiting the present invention. Accordingly, the scope of the present invention is not limited to the embodiments or examples specifically described herein, but only by the claims.

EXAMPLES

Example 1: Microcolumn for Microseparation

A microcolumn shown in the schematic diagram of FIG. 12 was produced according to the following procedure.

1.1 Preparation of Monolithic Packing-Embedded Capillaries (0.25 mm Inner Diameter)

A monolithic structure with glycol groups inside a fused silica capillary (with a polyimide coating) (Molex LLC, USA) with an outer diameter of 0.36 mm and an inner diameter of 0.25 mm. (See Lou, et al., J. Chromatogr. A, 926, 255-264 (2001); Lee, Svec & Frechet, J. Chromatogr. 1051, 53-60 (2004); Jiang, Mallik & Hage, Anal. Chem. (2005)). In the examples herein, monolithic structures with glycol groups are referred to as glycol monoliths.

1.2 Preparation of Inner Column Tube (Inner Diameter 0.25 mm) Filled with Glycol Monolith The glycol monolith-containing capillary was cut to about 10 mm to prepare a glycol monolith-filled internal column tube.

1.3 Fabrication of Microcolumns and Connecting Structures

As a tubular member, a Teflon (registered trademark) tube with an outer diameter of 1.6 mm and an inner diameter of 0.3 mm (Hagitec Co., Ltd., Yotsukaido City, Chiba Prefecture) was cut to a length of 30 mm, and heated needles were pushed into the openings at both ends to make flares. The glycol monolith-filled inner column tube described above was pressed end-to-end into a Teflon tube. The Teflon tube was heated to facilitate the press fit. After the entire inner column was press-fitted into the Teflon (registered trademark) tube, the microcolumn was completed with further pressing the inner column tube until it reached the center of the Teflon tube by using a capillary (with polyimide outer coating) (Molex LLC, USA) with an outer diameter of 0.35 mm and an inner diameter of 0.05 mm as a push rod. A connecting structure including the microcolumn was completed by connecting fused silica capillaries (with a polyimide coating) with an outer diameter of 0.36 mm (Molex LLC, USA) on both sides of the microcolumn.

Example 2: Microcolumn with an Intermediate Tube for Microseparation

A microcolumn shown in the schematic diagram of FIG. 13 was produced according to the following procedure.

2.1 Fabrication of Monolithic Packing-Embedded Capillaries (0.8 mm Inner Diameter)

A glycol monolith was formed in the same manner as an Example 1 in a glass capillary (Fuji Rika Kogyo Co., Ltd., Osaka City) having an outer diameter of 1.6 mm and an inner diameter of 0.8 mm.

2.2 Preparation of Inner Column Tube (Inner Diameter 0.8 mm) Filled with Glycol Monolith The above glycol monolith-containing capillary was cut to a length of about 3 mm, and both ends were polished with No. 400 waterproof sandpaper to a length of 2.0 mm to complete a glycol monolith-filled inner column tube.

2.3 Fabrication of Microcolumn and Connection Structure

As an intermediate tube, a Teflon (registered trademark) tube having an outer diameter of 1.6 mm and an inner diameter of 0.3 mm was cut into a length of 10 mm, and a heated needle was pushed into one opening to make it a flare. An intermediate tube, a glycol monolith-filled inner column tube, and an intermediate tube were inserted in this order into a tubular member of a heat-shrinkable tube (Sumitube A, Sumitomo Electric Industries, Ltd., Osaka) having an inner diameter of 2.1 mm, a wall thickness of 0.2 mm, and a length of 30 mm. At this time, the side of the intermediate tube with a flare was placed on the outside. The three parts were placed in close contact in a heat-shrinkable tube, and the whole was placed in an air stream at 100° C. for about 30 seconds to shrink the tube. After allowing to cool, both ends of the heat-shrinkable tube were cut to be longer than the ends of the intermediate tube by about 0.5 mm to complete a microcolumn. The connecting structure was completed by connecting fused silica capillaries (0.36 mm outer diameter, polyimide coated) (Molex LLC, USA) with stoppers fixed 10.5 mm from the end to both sides of the microcolumn. The stopper was attached by cutting a PEEK tube (Upchurch Scientific Inc., USA) with an outer diameter of 1.6 mm and an inner diameter of 0.4 mm (Upchurch Scientific Inc., USA) into a length of 1 mm, passing the capillary through the tube, and fixing it with an instant adhesive.

The microcolumn prepared in this example holds more packing material than the microcolumn prepared in Example 1, so it is thought that a larger amount of the analyte can be separated, and the types of analytes that can be detected in excess over the detection limit increase. In addition, since the inner diameter of the inner column tube is large, the pressure applied to the microcolumn can be reduced, enabling analysis at a higher flow rate in a shorter time.

Example 3: Microcolumn with Flow Control Function

A microcolumn shown in the schematic diagram of FIG. 14 was produced according to the following procedure.

3.1 Fabrication of Glycol Monolith Filled Inner Column Tube

In the same manner as an Example 2, a glycol monolith-filled inner column tube (outer diameter 1.6 mm, inner diameter 0.8 mm, length 2.0 mm) was produced.

3.2 Fabrication of Microcolumns and Connecting Structures

As an intermediate tube, Teflon (registered trademark) tube with an outer diameter of 1.6 mm and an inner diameter of 0.3 mm was cut to a length of 10 mm, and a heated needle was inserted into one opening of the tube segment to make a flare. On the other end face, eight grooves with a depth of about 0.1 mm extending radially from the center were formed by cutting. An intermediate tube, a glycol monolith-filled inner column tube, and an intermediate tube were inserted in this order into a silicone tube (Nagayanagi Kogyo Co., Ltd., Tokyo) having an outer diameter of 2 mm, an inner diameter of 1.5 mm, and a length of 22 mm to form a microcolumn. At this time, the intermediate tube was arranged so that the flared opening was on the outside, and the three parts were brought into close contact within the silicone tube. To one of the intermediate tubes of the microcolumn, a fused-silica capillary (outer coated with polyimide, inner coated with hydrophilic polymer, an outer diameter of 0.36 mm and an inner diameter of 0.15 mm) with a stopper (same as in Example 2) 10 mm from the end was connected and, to the other intermediate tube, a fused-silica capillary for capillary isoelectric focusing (outer coated with polyimide, inner coated with hydrophilic polymer, an outer diameter of 0.36 mm and an inner diameter of 0.05 mm) with a stopper same as above was connected. To a pressure control member (made by PMMA) (Miyamoto Jushi Kogyo Co., Ltd., Fukushima City) with an inner diameter of 2.7 mm at the center, an O-ring (NSA3 standard, wire diameter 1.5 mm, inner diameter 2.5 mm, outer diameter 5.5 mm) and a set screw were attached, the microcolumn was inserted, the set screws were tightened to fix the column, and the connection structure of the microcolumn connected to the capillary for isoelectric focusing was completed.

The small size of the microcolumns allows for fine tuning of the flow, addressing the problem of electroosmotic flow that otherwise compromise isoelectric focusing in the capillary downstream.

As described above, although the present invention has been illustrated using the preferred embodiments of the present invention, the present invention should not be construed as being limited to this embodiment. It is understood that the invention is to be construed in scope only by the claims. It is understood that a person skilled in the art can implement an equivalent range from the description of specific preferred embodiments of the present disclosure based on the description of the present disclosure and common general technical knowledge. It is understood that the documents cited herein are to be incorporated by reference herein in the same manner as if the contents themselves were specifically set forth herein.

INDUSTRIAL APPLICABILITY

The present disclosure is useful as it can provide a scanning unit that enables simple and highly accurate detection of a sample in a capillary. The present disclosure also provides novel microcolumns, which can be used in capillary-based analytical techniques such as capillary electrophoresis and LC-MS, and the like.

CODE EXPLANATION

5: Capillaries
12: Capillary axes
101: Light source
102: Incident side light transmission member
106: Output side light transmission member
107: Photodetector
110: Scanning unit
112: Housing
114: Scanning base
118: Optical unit
120: First optical system
122: Incident side collimating lens
124: Incident side condenser lens
126: Opening
128: First optical axis
130: Second optical system
132: Output side collimating lens
134: Output side condensing lens
138: Second optical axis
142: Incident side light transmission member connecting port
144: Output side light transmission member connecting port
150: Restriction unit
151: Restriction plate
160: Pressure plate
1280: Connection structure
1282: Microcolumn
1283: Positioning device
1284: Predetermined space
1285: Tubular member
1286: Inner column tube
1287: Packings
1288: Intermediate tube
1290: Pressure control member
1291: Push screw
1292: O-ring

The invention claimed is:

1. A scanning unit that moves in the axial direction of a capillary,
the scanning unit comprising:
an optical system unit having an optical system; and
a restriction unit being separated from the optical system unit and restricting the capillary in an appropriate position,
the optical system unit comprising:
a first optical system having one or more optical elements that transmits incident-side light along a first optical axis to the appropriate position;
a second optical system having one or more optical elements that transmits output-side light emitted from the appropriate position along a second optical axis,
the restriction unit comprising:
a guide for restricting radial movement of the capillary with respect to the optical system unit; and
a contact surface that contacts the optical system unit,
the scanning unit, wherein the first optical system and the second optical system are arranged such that the angle formed by the first optical axis and the second optical axis is not 180 degrees.

2. The scanning unit according to claim 1, wherein the restriction unit comprising:
a restriction plate having a groove for restricting radial movement of the capillary with respect to the optical system unit;
a contact surface that contacts the optical system unit; and
a pressure plate configured to settle the capillary in the groove in pressed state.

3. The scanning unit according to claim 1, further comprising a position adjusting mechanism for changing the relative position between the restriction unit and the optical system unit,
wherein the restriction unit moves relative to the optical system unit along the contact surface of the restriction plate by sliding in the radial direction of said capillary.

4. The scanning unit according to claim 2, wherein the scanning unit is configured to move vertically along the axial direction of the capillary, and the position adjusting mechanism includes a position adjusting tool, and the position adjusting tool is provided on the side of the restriction unit.

5. The scanning unit according to claim 1, wherein the optical element in the first optical system includes an incident-side condenser lens, and the optical element in the second optical system includes an output-side condenser lens.

6. The scanning unit according to claim 1, wherein the first optical system further comprises a light transmission member connecting port for connecting a light transmission member to the scanning unit,
wherein the incident-side light is transmitted from a light source via the light transmission member.

7. The scanning unit according to claim 1, wherein the second optical system further comprises a light transmission member connecting port that connects a light transmission member to the scanning unit, and the light on the output side is transmitted to a photodetector via the light transmission member.

8. The scanning unit according to claim 1, further comprising a photodetector and/or filter unit, wherein said photodetector and/or filter unit being configured to be directly connected with said second optical system.

9. A light detection system, comprising:
a capillary having a scanning region;
the scanning unit according to claim 6;
a light source; and
a photodetector that receives light emitted from the scanning unit.

10. A light detection system, comprising:
a capillary having a scanning region;
the scanning unit according to claim 7;
a light source; and
a photodetector that receives light emitted from the scanning unit.

11. A light detection system, comprising:
a capillary having a scanning region;
the scanning unit according to claim 8; and
a light source.

12. The system according to claim 9, further comprising:
an anolyte solution connected to the first end of the capillary;
a catholyte solution connected to the second end of the capillary; and
a boundary detector that detects a boundary between different solutions in the capillary.

13. The system according to claim 10, further comprising:
an anolyte solution connected to the first end of the capillary;
a catholyte solution connected to the second end of the capillary; and
a boundary detector that detects a boundary between different solutions in the capillary.

14. The system according to claim 11, further comprising:
an anolyte solution connected to the first end of the capillary;
a catholyte solution connected to the second end of the capillary; and
a boundary detector that detects a boundary between different solutions in the capillary.

15. The system according to claim 9, further comprising a frame surrounding said scanning region of the capillary.

16. The system according to claim 10, further comprising a frame surrounding said scanning region of the capillary.

17. The system according to claim 11, further comprising a frame surrounding said scanning region of the capillary.

18. A method for detecting a sample by capillary isoelectric focusing using the system according to claim 12.

19. A method for detecting a sample by capillary isoelectric focusing using the system according to claim 13.

20. A method for detecting a sample by capillary isoelectric focusing using the system according to claim 14.

* * * * *